(12) United States Patent
Menezes et al.

(10) Patent No.: US 9,008,610 B2
(45) Date of Patent: Apr. 14, 2015

(54) OPERATING SYSTEM SUPPORTING COST AWARE APPLICATIONS

(71) Applicant: Microsoft Corporation, Redmond, WA (US)

(72) Inventors: Pascal Menezes, Bellevue, WA (US); Marco Piumatti, Woodinville, WA (US); Upshur W. Parks, Bothell, WA (US); Ravi Rao, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/844,932

(22) Filed: Mar. 16, 2013

(65) Prior Publication Data

US 2013/0217357 A1    Aug. 22, 2013

Related U.S. Application Data

(63) Continuation of application No. 12/972,230, filed on Dec. 17, 2010.

(51) Int. Cl.
*H04M 11/00* (2006.01)
*H04M 15/00* (2006.01)
(Continued)

(52) U.S. Cl.
CPC .............. *H04M 15/885* (2013.01); *H04W 4/26* (2013.01); *H04M 15/72* (2013.01); *H04M 15/80* (2013.01); *H04M 15/8016* (2013.01); *H04M 15/8022* (2013.01); *H04M 15/8044* (2013.01);
(Continued)

(58) Field of Classification Search
USPC ........ 455/406, 405, 566, 437; 705/10, 30, 34; 370/232
See application file for complete search history.

(56) References Cited

U.S. PATENT DOCUMENTS 4,949,299 A    8/1990    Pickett
5,682,382 A   10/1997    Shepard
(Continued)

FOREIGN PATENT DOCUMENTS

CN    1571341 A    1/2005
CN    1592210 A    3/2005
(Continued)

OTHER PUBLICATIONS

PCT International Search Report and Written Opinion for Application No. PCT/US2011/065692, Sep. 5, 2012.
(Continued)

*Primary Examiner* — David Q Nguyen
(74) *Attorney, Agent, or Firm* — John Jardine; Raghu Chinagudbha; Micky Minhas

(57) ABSTRACT

A mobile computing device that supports cost-aware application components for operation over a metered network. A current basis for computing usage charges over one or more networks may be made available to the cost-aware application components through an application programming interface supported by an operating system service. That service may receive a policy for charging for data usage over a network and may also obtain information defining data usage for the mobile computing device. Based on this information, the service may determine a current basis for charging for data usage. With this information, the application component can determine a manner for executing network operations that involve data transmission over the network, such as deferring the operation or selecting an alternative network.

20 Claims, 8 Drawing Sheets

(51) Int. Cl.
  *H04W 4/26* (2009.01)
  *H04L 12/14* (2006.01)
(52) U.S. Cl.
  CPC .............. *H04M15/83* (2013.01); *H04M 15/85* (2013.01); *H04L 12/1407* (2013.01); *H04L 12/1485* (2013.01); *H04M 15/886* (2013.01)

(56) References Cited

U.S. PATENT DOCUMENTS

| | | | |
|---|---|---|---|
| 5,729,682 A | 3/1998 | Marquis | |
| 6,288,749 B1 | 9/2001 | Freadman | |
| 6,317,490 B1 | 11/2001 | Cameron | |
| 6,338,046 B1* | 1/2002 | Saari et al. | 705/34 |
| 6,343,205 B1 | 1/2002 | Threadgill | |
| 6,553,060 B2 | 4/2003 | Souissi | |
| 6,628,965 B1 | 9/2003 | LaRosa | |
| 6,665,709 B1 | 12/2003 | Barron | |
| 6,711,617 B1 | 3/2004 | Bantz | |
| 6,789,228 B1 | 9/2004 | Merril | |
| 6,823,379 B1 | 11/2004 | Heckel | |
| 7,020,472 B2 | 3/2006 | Schmidt | |
| 7,027,808 B2 | 4/2006 | Wesby | |
| 7,058,696 B1 | 6/2006 | Phillips | |
| 7,107,009 B2 | 9/2006 | Sairanen | |
| 7,110,843 B2 | 9/2006 | Pagnano | |
| 7,177,288 B2 | 2/2007 | Mooney | |
| 7,194,278 B1 | 3/2007 | Cook | |
| 7,280,978 B1 | 10/2007 | Joao | |
| 7,290,132 B2 | 10/2007 | Aboba | |
| 7,349,342 B2 | 3/2008 | Carpenter | |
| 7,412,534 B2 | 8/2008 | Tsang | |
| 7,461,253 B2 | 12/2008 | Braskich | |
| 7,496,637 B2 | 2/2009 | Han | |
| 7,558,604 B2 | 7/2009 | Narayanaswami | |
| 7,562,129 B1 | 7/2009 | Lee et al. | |
| 7,577,125 B2 | 8/2009 | Abhishek | |
| 7,589,693 B2 | 9/2009 | Locke | |
| 7,640,213 B2 | 12/2009 | Reunert | |
| 7,721,093 B2 | 5/2010 | Sundararajan | |
| 7,751,317 B2 | 7/2010 | Toyama et al. | |
| 7,769,394 B1 | 8/2010 | Zhu | |
| 7,925,739 B2 | 4/2011 | Kocho | |
| 7,962,854 B2 | 6/2011 | Vance | |
| 8,014,415 B2 | 9/2011 | Alapuranen | |
| 8,095,111 B2 | 1/2012 | Henry | |
| 8,254,992 B1 | 8/2012 | Ashenbrenner et al. | |
| 8,260,998 B2 | 9/2012 | Ganesh et al. | |
| 8,285,250 B2* | 10/2012 | Rubin et al. | 455/405 |
| 8,323,040 B2 | 12/2012 | Prest | |
| 8,326,958 B1 | 12/2012 | Raleigh | |
| 8,397,982 B2 | 3/2013 | Slaby et al. | |
| 8,437,736 B2* | 5/2013 | Rubin et al. | 455/405 |
| 8,633,616 B2 | 1/2014 | Soar | |
| 8,659,565 B2 | 2/2014 | Sirpal et al. | |
| 2001/0021950 A1 | 9/2001 | Hawley et al. | |
| 2001/0037399 A1 | 11/2001 | Eylon | |
| 2001/0042124 A1 | 11/2001 | Barron | |
| 2001/0046298 A1 | 11/2001 | Terada | |
| 2002/0067268 A1 | 6/2002 | Lee et al. | |
| 2002/0116485 A1 | 8/2002 | Black et al. | |
| 2002/0120935 A1 | 8/2002 | Huber | |
| 2002/0143819 A1 | 10/2002 | Han | |
| 2002/0154751 A1 | 10/2002 | Thompson | |
| 2002/0156876 A1 | 10/2002 | Hartman et al. | |
| 2003/0142651 A1 | 7/2003 | Matta et al. | |
| 2003/0187992 A1 | 10/2003 | Steenfeldt | |
| 2004/0002305 A1 | 1/2004 | Byman-Kivivuori et al. | |
| 2004/0006606 A1 | 1/2004 | Marotta | |
| 2004/0049576 A1 | 3/2004 | Schweitzer | |
| 2004/0061716 A1 | 4/2004 | Cheung | |
| 2004/0174395 A1 | 9/2004 | Liu | |
| 2004/0198374 A1 | 10/2004 | Bajikar | |
| 2004/0203815 A1 | 10/2004 | Shoemake et al. | |
| 2004/0210320 A1 | 10/2004 | Pandya | |
| 2005/0028208 A1 | 2/2005 | Ellis | |
| 2005/0071319 A1 | 3/2005 | Kelley | |
| 2005/0083975 A1 | 4/2005 | Macri | |
| 2005/0105632 A1 | 5/2005 | Catreux-Erces | |
| 2005/0135235 A1 | 6/2005 | Maruyama | |
| 2005/0177715 A1 | 8/2005 | Somin | |
| 2005/0198238 A1 | 9/2005 | Sim | |
| 2005/0221844 A1 | 10/2005 | Trethewey | |
| 2005/0223226 A1 | 10/2005 | Sundararajan | |
| 2005/0249266 A1 | 11/2005 | Brown | |
| 2006/0015904 A1 | 1/2006 | Marcus | |
| 2006/0041916 A1 | 2/2006 | McQuaide | |
| 2006/0059462 A1 | 3/2006 | Yamamoto | |
| 2006/0107036 A1 | 5/2006 | Randle et al. | |
| 2006/0143027 A1* | 6/2006 | Jagannathan et al. | 705/1 |
| 2006/0145815 A1 | 7/2006 | Lanzieri | |
| 2006/0239208 A1 | 10/2006 | Roberts | |
| 2006/0294112 A1 | 12/2006 | Mandato et al. | |
| 2007/0054616 A1 | 3/2007 | Culbert | |
| 2007/0057793 A1 | 3/2007 | Alden | |
| 2007/0064604 A1 | 3/2007 | Chen | |
| 2007/0124485 A1 | 5/2007 | Frost | |
| 2007/0153695 A1 | 7/2007 | Gholmieh | |
| 2007/0153729 A1 | 7/2007 | Alapuranen | |
| 2007/0161411 A1* | 7/2007 | Liao et al. | 455/566 |
| 2007/0171915 A1 | 7/2007 | Toyama et al. | |
| 2007/0192735 A1 | 8/2007 | Lehto | |
| 2007/0207750 A1 | 9/2007 | Brown | |
| 2007/0223398 A1 | 9/2007 | Luo et al. | |
| 2007/0225831 A1 | 9/2007 | Sakurada | |
| 2007/0248179 A1 | 10/2007 | Hassan | |
| 2007/0254628 A1* | 11/2007 | Rybak | 455/405 |
| 2007/0271525 A1 | 11/2007 | Han et al. | |
| 2007/0274488 A1 | 11/2007 | Callaghan | |
| 2007/0280332 A1 | 12/2007 | Srikanteswara | |
| 2007/0280481 A1 | 12/2007 | Eastlake | |
| 2008/0002658 A1 | 1/2008 | Soliman | |
| 2008/0016338 A1 | 1/2008 | Sun | |
| 2008/0055399 A1 | 3/2008 | Woodworth | |
| 2008/0063204 A1 | 3/2008 | Braskich | |
| 2008/0081597 A1 | 4/2008 | Cole | |
| 2008/0104170 A1 | 5/2008 | Ananthanarayanan | |
| 2008/0130519 A1 | 6/2008 | Bahl | |
| 2008/0130639 A1 | 6/2008 | Costa-Requena | |
| 2008/0152098 A1 | 6/2008 | Paryzek et al. | |
| 2008/0197802 A1 | 8/2008 | Onishi et al. | |
| 2008/0207119 A1 | 8/2008 | Chang | |
| 2008/0207128 A1 | 8/2008 | Mikko | |
| 2008/0227384 A1 | 9/2008 | Placzek | |
| 2008/0252419 A1 | 10/2008 | Batchelor | |
| 2008/0275993 A1 | 11/2008 | Mohammed | |
| 2008/0293375 A1 | 11/2008 | Swanburg | |
| 2008/0293419 A1* | 11/2008 | Somasundaram et al. | 455/437 |
| 2008/0311952 A1 | 12/2008 | Sugiyama | |
| 2008/0319857 A1 | 12/2008 | Dobbins | |
| 2009/0011738 A1 | 1/2009 | Sasakura | |
| 2009/0013175 A1 | 1/2009 | Elliott | |
| 2009/0039828 A1 | 2/2009 | Jakubowski | |
| 2009/0045913 A1 | 2/2009 | Nelson | |
| 2009/0055266 A1 | 2/2009 | Brody | |
| 2009/0089885 A1 | 4/2009 | Noble | |
| 2009/0100080 A1 | 4/2009 | Toms | |
| 2009/0103481 A1 | 4/2009 | Mahajan | |
| 2009/0106542 A1 | 4/2009 | Dubs | |
| 2009/0111378 A1 | 4/2009 | Sheynman | |
| 2009/0138715 A1 | 5/2009 | Xiao | |
| 2009/0144622 A1 | 6/2009 | Evans | |
| 2009/0154343 A1 | 6/2009 | Fitch | |
| 2009/0158394 A1 | 6/2009 | Oh et al. | |
| 2009/0170431 A1 | 7/2009 | Pering | |
| 2009/0196180 A1 | 8/2009 | Bahl | |
| 2009/0210940 A1 | 8/2009 | Dean | |
| 2009/0303902 A1 | 12/2009 | Liu | |
| 2009/0319663 A1 | 12/2009 | Giles | |
| 2010/0049971 A1 | 2/2010 | Oh | |
| 2010/0091965 A1 | 4/2010 | Ma et al. | |
| 2010/0100637 A1 | 4/2010 | Bowra | |
| 2010/0103850 A1 | 4/2010 | Gossain | |
| 2010/0104078 A1 | 4/2010 | Henry, Jr. et al. | |

(56) References Cited

U.S. PATENT DOCUMENTS

| | | | |
|---|---|---|---|
| 2010/0110890 A1* | 5/2010 | Rainer et al. | 370/232 |
| 2010/0111033 A1 | 5/2010 | Erceg | |
| 2010/0115278 A1 | 5/2010 | Shen | |
| 2010/0121744 A1 | 5/2010 | Belz | |
| 2010/0144274 A1 | 6/2010 | Mcdowall | |
| 2010/0153762 A1 | 6/2010 | Radulescu | |
| 2010/0175101 A1 | 7/2010 | Devictor | |
| 2010/0186066 A1 | 7/2010 | Pollard | |
| 2010/0191576 A1 | 7/2010 | Raleigh | |
| 2010/0191847 A1 | 7/2010 | Raleigh | |
| 2010/0195580 A1 | 8/2010 | Samarasooriya | |
| 2010/0198952 A1 | 8/2010 | Kneckt | |
| 2010/0220856 A1 | 9/2010 | Kruys | |
| 2010/0226253 A1 | 9/2010 | Bugenhagen | |
| 2010/0232332 A1 | 9/2010 | Abdel-Kader | |
| 2010/0257251 A1 | 10/2010 | Mooring | |
| 2010/0284316 A1 | 11/2010 | Sampathkumar | |
| 2010/0333032 A1 | 12/2010 | Lau | |
| 2011/0107388 A1 | 5/2011 | Lee | |
| 2011/0145581 A1 | 6/2011 | Malhotra | |
| 2011/0149806 A1 | 6/2011 | Verma | |
| 2011/0176463 A1 | 7/2011 | Cowan et al. | |
| 2011/0188419 A1 | 8/2011 | Filoso | |
| 2011/0188420 A1 | 8/2011 | Filoso | |
| 2011/0238498 A1 | 9/2011 | Hassan | |
| 2011/0261001 A1 | 10/2011 | Liu | |
| 2011/0274020 A1 | 11/2011 | Filoso | |
| 2011/0275316 A1 | 11/2011 | Suumaki | |
| 2011/0280413 A1 | 11/2011 | Wu | |
| 2011/0293095 A1 | 12/2011 | Ayed | |
| 2011/0320963 A1 | 12/2011 | Wong | |
| 2011/0321126 A1 | 12/2011 | Maniatopoulos | |
| 2012/0101952 A1 | 4/2012 | Raleigh | |
| 2012/0139690 A1 | 6/2012 | Gupta | |
| 2012/0144083 A1 | 6/2012 | Hassan | |
| 2012/0147268 A1 | 6/2012 | Hassan | |
| 2012/0147274 A1 | 6/2012 | Hassan | |
| 2012/0147825 A1 | 6/2012 | Hassan | |
| 2012/0155643 A1 | 6/2012 | Hassan | |
| 2012/0157038 A1 | 6/2012 | Menezes et al. | |
| 2012/0158839 A1 | 6/2012 | Hassan | |
| 2012/0158947 A1 | 6/2012 | Hassan | |
| 2012/0158981 A1 | 6/2012 | Desai | |
| 2012/0178429 A1 | 7/2012 | Camps Mur | |
| 2012/0197792 A1 | 8/2012 | Raleigh | |
| 2013/0033800 A1 | 2/2013 | Bartnik et al. | |
| 2013/0097422 A1 | 4/2013 | Salomone | |
| 2013/0182614 A1 | 7/2013 | Kumar et al. | |

FOREIGN PATENT DOCUMENTS

| | | |
|---|---|---|
| CN | 1607780 | 4/2005 |
| CN | 1607780 A | 4/2005 |
| CN | 1677975 | 10/2005 |
| CN | 1677975 A | 10/2005 |
| CN | 1929424 | 3/2007 |
| CN | 1929424 A | 3/2007 |
| CN | 1960474 | 5/2007 |
| CN | 1960474 A | 5/2007 |
| CN | 101021774 A | 8/2007 |
| CN | 101044718 A | 9/2007 |
| CN | 101075820 A | 11/2007 |
| CN | 101094140 | 12/2007 |
| CN | 101094140 A | 12/2007 |
| CN | 101137960 | 3/2008 |
| CN | 101137960 A | 3/2008 |
| CN | 101147308 | 3/2008 |
| CN | 101147308 A | 3/2008 |
| CN | 101179359 | 5/2008 |
| CN | 101179359 A | 5/2008 |
| CN | 101288063 | 10/2008 |
| CN | 101288063 A | 10/2008 |
| CN | 101657828 A | 2/2010 |
| CN | 101841637 A | 9/2010 |
| CN | 101867623 | 10/2010 |
| CN | 101867623 A | 10/2010 |
| EP | 2256663 A | 12/2010 |
| GB | 2418809 A * | 4/2006 |
| JP | 2005-295286 | 10/2005 |
| JP | 2005295286 A | 10/2005 |
| JP | 2005-341094 | 12/2005 |
| JP | 2005341094 A | 12/2005 |
| JP | 2006-050216 | 2/2006 |
| JP | 2006050216 A | 2/2006 |
| KR | 10-2008-0032979 | 4/2008 |
| KR | 2008032979 A | 4/2008 |
| KR | 10-2010-0038089 | 4/2010 |
| KR | 20100038089 A | 4/2010 |
| WO | 0154342 A | 7/2001 |
| WO | WO 01/54342 | 7/2001 |
| WO | 2008021855 A | 2/2008 |
| WO | WO 2008/021855 | 2/2008 |
| WO | 2008089854 A | 7/2008 |
| WO | 2008/127507 A1 | 10/2008 |
| WO | 2008127507 A | 10/2008 |
| WO | 2009046869 A | 4/2009 |
| WO | 2010044599 A | 4/2010 |
| WO | WO 2010/044599 | 4/2010 |

OTHER PUBLICATIONS

PCT International Search Report and Written Opinion for Application No. PCT/US2011/065691, Jul. 24, 2012.
T-mobile "Unlimited" Data Usage—Published Date: Mar. 9, 2010.
O2 Network Scraps Unlimited Data for Smartphones—Published Date: Jun. 10, 2010.
Mobile Internet Usage Measurements—Case Finland—Published Date: Apr. 24, 2006.
MIST: Cellular Data Network Measurement for Mobile Applications—Published Date: Apr. 24, 2006.
"Omnidrive", 2006.
Wood, "Kowari: A Platform for Semantic Web Storage and Analysis", May 27, 2005.
"Xdrive", 2006.
Mohammed, "Web Service for User and Subscription Data Storage", U.S. Appl. No. 13/772,275, filed Feb. 20, 2013.
"Manage Subscription Products and Automate Recurring Billing Operations", Z-billing, 2008.
"Subscription Management", Advantage Computing Systems, 2009.
"Torres Service Management Platform", Torres Networks, Retrieved Jan. 12, 2010.
Travis, "Creating Customized Web Experiences with Windows Media Player 9 Series", Nov. 2002.
"VAS Subscription Manager", Motricity, Retrieved Jan. 12, 2010.
Cisco, "802.11n Wireless Technology Overview: Deploying the Next Generation of High Performance Wireless" Aug. 2007.
Motorola, "Tv White Space Position Paper: Fixed TV White Space Solutions for Wireless ISP Network Operators", Nov. 2008.
"Our Technology", Shared Spectrum Company, Oct. 3, 2010.
PCT International Search Report and Written Opinion for Application No. PCT/US2011/063340, Jun. 22, 2012.
Yuan, "Allocating Dynamic Time-Spectrum Blocks in Cognitive Radio Networks", Sep. 9-14, 2007.
Balachandran, "CRTDH: An Efficient Key Agreement Scheme for Secure Group Communications in Wireless Ad Hoc Networks" May 16-20, 2005.
Devinator, "802.11 Fast BSS Transition (FT) Part 1 of 2", Aug. 21, 2007.
"FAQs", Wi-Fi Alliance, Copyright 2010, Filed in U.S. Appl. No. 12/970,069, filed Dec. 16, 2010.
Frankel, "Guide to IEEE 802.11i: Establishing Robust Security Networks", National Institute of Standards and Technology, Jun. 2006.
"Manifest.permission", Android Developers, Jul. 21, 2004.
Shih, "Wake on Wireless: An Event Driven Energy Saving Strategy for Battery Operated Devices", Sep. 23-26, 2002.
Sridhar, "Wi-Fi, Bluetooth and WiMAX", The Internet Protocol Journal, Dec. 2008.
"Symbian Foundation Peer-to-Peer WiFi Inititative (WiFi Direct)", Symbian Developer Community, Sep. 10, 2010.

(56) References Cited

OTHER PUBLICATIONS

PCT International Search Report and Written Opinion for Application No. PCT/US2011/065276, Aug. 14, 2012.
PCT International Search Report and Written Opinion for Application No. PCT/US2011/063207, Jul. 12, 2012.
"Wi-Fi Certified Wi-Fi Direct Personal, Portable Wi-Fi Technology", Wi-Fi Alliance, Oct. 2010.
Ward, "A New Location Technique for the Active Office", Oct. 1997.
"How Do You Use a Laptop As a TV Remote Control?", Jul. 15, 2008.
Meinrath, "Unlicensed White Space Device' Operations on the TV Band and the Myth of Harmful Interferences", Mar. 2008.
PCT International Search Report and Written Opinion for Application No. PCT/US2011/065285, Jul. 31, 2012.
PCT International Search Report and Written Opinion for Application No. PCT/US2011/064753, Aug. 31, 2012.
Rankin, "Wireless PC to TV", Jun. 1, 2009.
"WinLiRC", Sourceforge, Mar. 17, 2008.
CN Search Report for Application No. 201110423001.3, Nov. 12, 2013.
CN Second Office Action for Application No. 201110423001.3, Apr. 1, 2014.
Menezes, Pascal; "Operating System Supporting Cost Aware Applications"; U.S. Appl. No. 14/318,380, filed Mar. 16, 2013; 56 pages.
Notice of Allowance mailed Jun. 27, 2014 in U.S. Appl. No. 12/970,159, 8 pages.
Office Action dated Jun. 5, 2014 in CN Pat. App. No. 201110417226.8, 14 pages, including partial translation and/or concise explanation of relevance.
Non-Final Office Action mailed Jul. 18, 2014 in U.S. Appl. No. 12/970,034, 24 pages.
Non-Final Office Action mailed Oct. 16, 2012 in U.S. Appl. No. 12/970,069, 23 pages.
Non-Final Office Action mailed Oct. 26, 2012 in U.S. Appl. No. 12/967,761, 24 pages.
Non-Final Office Action mailed Nov. 6, 2013 in U.S. Appl. No. 12/960,730, 16 pages.
Non-Final Office Action mailed Feb. 28, 2014 in U.S. Appl. No. 12/970,159, 22 pages.
Non-Final Office Action mailed Apr. 11, 2013 in U.S. Appl. No. 12/972,104, 15 pages.
Non-Final Office Action mailed Apr. 14, 2011 in U.S. Appl. No. 11/726,862, 22 pages.
Non-Final Office Action mailed Apr. 5, 2012 in U.S. Appl. No. 11/726,862, 23 pages.
Non-Final Office Action mailed May 23, 2014 in U.S. Appl. No. 12/748,829, 30 pages.
Non-Final Office Action mailed May 23, 2014 in U.S. Appl. No. 12/960,730, 18 pages.
Non-Final Office Action mailed May 30, 2013 in U.S. Appl. No. 12/970,034, 22 pages.
Non-Final Office Action mailed Jun. 18, 2014 in U.S. Appl. No. 12/960,753, 12 pages.
Non-Final Office Action mailed Jun. 20, 2014 in U.S. Appl. No. 12/972,104, 10 pages.
Non-Final Office Action mailed Jun. 23, 2010 in U.S. Appl. No. 11/726,862, 16 pages.
Non-Final Office Action mailed Jun. 9, 2014 in U.S. Appl. No. 12/970,069, 20 pages.
Non-Final Office Action mailed Aug. 14, 2013 in U.S. Appl. No. 12/967,638, 30 pages.
Non-Final Office Action mailed Aug. 16, 2013 in U.S. Appl. No. 12/970,069, 26 pages.
Non-Final Office Action mailed Aug. 9, 2012 in U.S. Appl. No. 12/748,829, 29 pages.
Non-Final Office Action mailed Sep. 24, 2012 in U.S. Appl. No. 12/964,492, 10 pages.
Non-Final Office Action mailed Sep. 6, 2012 in U.S. Appl. No. 12/972,230, 10 pages.
Notice of Allowance mailed Nov. 20, 2012 in U.S. Appl. No. 12/972,230, 9 pages.
Notice of Allowance mailed Dec. 26, 2013 in U.S. Appl. No. 12/972,230, 8 pages.
Notice of Allowance mailed Mar. 10, 2014 in U.S. Appl. No. 12/972,230, 8 pages.
Notice of Allowance mailed Mar. 20, 2013 in U.S. Appl. No. 12/964,492, 9 pages.
Notice of Allowance mailed Mar. 25, 2013 in U.S. Appl. No. 12/972,230, 8 pages.
Notice of Allowance mailed Mar. 4, 2013 in U.S. Appl. No. 12/972,230, 7 pages.
Notice of Allowance mailed Mar. 6, 2014 in U.S. Appl. No. 12/967,638, 11 pages.
Notice of Allowance mailed Apr. 2, 2014 in U.S. Appl. No. 12/964,492, 9 pages.
Notice of Allowance mailed Jul. 12, 2013 in U.S. Appl. No. 12/967,761, 12 pages.
Office Action dated Apr. 1, 2014 in CN Pat. App. No. 201110423001.3, 8 pages, including partial translation.
Office Action dated Apr. 3, 2014 in CN Pat. App. No. 201110417153.2, 15 pages, including partial translation and/or concise explanation of relevance.
Shared Spectrum, Inc., "Our Technology," Nov., 2010, 2 pages.
Shih, Eugene et al.; Wake on Wireless: An Event Driven Energy Saving; Published Date: Sep. 23-26, 2002; 12 pages.
Sridhar, T.; Wi-Fi, Bluetooth and WiMAX; The Internet Protocol Journal, vol. 11, No. 4; Retrieved Date: Sep. 30, 2010, 9 pages.
Subscription Management; Copyright 2009; Retrieved Date: Jan. 12, 2010; 2 pages.
Symbian Foundation Peer-to-Peer WiFi Inititative (WiFi Direct); Published Date: Sep. 10, 2010, 11 pages.
Texas Instruments, MSP430 Ultra-Low-Power MCUs and Ti-RFid Devices, 2 pages, 2009.
T-mobile "Unlimited" Data Usage; Published Date: Mar. 9, 2010; 6 pages.
Torres Service Management Platform; Retrieved Date: Jan. 12,2010; 2 pages.
VAS Subscription Manager; Retrieved Date: Jan. 12, 2010; 1 page.
Wi-Fi Alliance: FAQs; Published Date: 2010; 19 pages.
Wi-Fi Certified Wi-Fi Direct, Personal, Portable Wi-Fi Technology; Oct. 2010, 14 pages.
WinLIRC; Published Date: Mar. 17, 2008; 5 pages.
Wireless PC to TV; Retrieved Date: Sep. 9, 2010; 2 pages.
Wood, "Kowari: A Platform for Semantic Web Storage and Analysis", May 27, 2005, 16 pages.
Yuan, Y. et al., "Allocating Dynamic Time-Spectrum Blocks in Cognitive Radio Networks," Sep. 9-14, 2007, 10 pages.
"International Search Report", Mailed Date: Aug. 14, 2012, Application No. PCT/US2011/065276, Filed Date: Dec. 15, 2011, pp. 9.
"International Search Report", Mailed Date: Jul. 12, 2012, Application No. PCT/US2011/063207, Filing Date: Dec. 4, 2011, pp. 9.
"International Search Report", Mailed Date: Jun. 22, 2012, Application No. PCT/US2011/063340, Filed Date: Dec. 5, 2011, pp. 9.
"Omnidrive", 2006, retrieved Oct. 26, 2006, 2 pages.
"Xdrive", 2006, retrieved Oct. 26, 2006, 2 pages.
"Second Office Action Issued in Chinese Patent Application No. 201110408217.2", Mailed Date: May 23, 2014, Filed Date: Dec. 9, 2011, 8 Pages including partial translation.
02 Network Scraps Unlimited Data for Smartphones; Published Date: Jun. 10, 2010; 2 pages.
802.11 Fast BSS Transition (FT) Part 1 of 2; Published Date: Aug. 21, 2007, 5 pages.
Advisory Action mailed Jan. 2, 2013 in U.S. Appl. No. 11/726,862, 3 pages.
Butler, Kevin R.B. et al.; Leveraging Identity-Based Cryptography for Node ID Assignment in Structured P2P Systems; IEEE Transactions on Parallel and Distributed Systems; vol. 20, No. 12; Dec. 2009; pp. 1803-1815.
Chinese Office Action dispatched Dec. 4, 2013 in CN Patent Application No. 201110426187.8, 8 pages including Concise Explanation of Relevance and/or partial translation.
Chinese Office Action dispatched Feb. 28, 2014 in CN Patent Application No. 201110426179.3, 9 pages including Concise Explanation of Relevance and/or partial translation.

(56) References Cited

OTHER PUBLICATIONS

Chinese Office Action mailed Jan. 6, 2014 in CN Patent App. No. 201110423068.7, 8 pages including concise explanation of relevance and partial translation.
Chinese Office Action mailed Nov. 20, 2013 in CN Patent App. No. 201110423001.3, 18 pages including translation.
Chinese Office Action mailed Dec. 4, 2013 in CN Patent App. No. 201110408217.2, 12 pages, including Concise Explanation of Relevance and/or partial translation.
Chinese Office Action mailed Dec. 4, 2013 in CN Patent App. No. 201110423031.4, 26 pages including translation.
Chinese Office Action mailed Feb. 17, 2014 in CN Patent App. No. 201110400433.2, 12 pages including partial translation.
Chinese Office Action mailed Feb. 27, 2014 in CN Patent App. No. 201110400472.2, 13 pages including Concise Explanation of Relevance and partial translation.
Cisco Systems, Inc., "802.11 n Wireless Technology Overview," 2007, 7 pages.
Creating Customized Web Experiences with Windows Media Player 9 Series; Published Date: Nov. 2002; 1 page.
CRTDH; An Efficient Key Agreement Scheme for Secure Group Communications in Wireless Ad Hoc Networks; Published Date: 2005, 5 pages.
Extended European Search Report dated May 20, 2014 in EP Patent App. No. 11847426.1, 8 pages
Final Office Action mailed Oct. 25, 2013 in U.S. Appl. No. 12/972,104, 10 pages.
Final Office Action mailed Nov. 13, 2012 in U.S. Appl. No. 12/748,829, 42 pages.
Final Office Action mailed Nov. 15, 2010 in U.S. Appl. No. 11/726,862, 21 pages.
Final Office Action mailed Dec. 26, 2013 in U.S. Appl. No. 12/967,638, 34 pages.
Final Office Action mailed Feb. 11, 2014 in U.S. Appl. No. 12/970,069, 26 pages.
Final Office Action mailed Feb. 15, 2013 in U.S. Appl. No. 12/967,761, 28 pages.
Final Office Action mailed Feb. 15, 2013 in U.S. Appl. No. 12/970,069, 23 pages.
Final Office Action mailed Mar. 28, 2013 in U.S. Appl. No. 12/967,638, 22 pages.
Final Office Action mailed Sep. 15, 2011 in U.S. Appl. No. 11/726,862, 24 pages.
Final Office Action mailed Sep. 20, 2012 in U.S. Appl. No. 11/726,862, 35 pages.
Final Office Action mailed Sep. 23, 2013 in U.S. Appl. No. 12/970,034, 22 pages.
Guide to IEEE 802.11i: Establishing Robust Security Networks; Published Date: Jun. 2006; 155 pages.
How Do You Use A Laptop As A TV Remote Control?; Published Date: Jul. 15, 2008; 6 pages.
International Search Report mailed Jul. 24, 2012 in PCT Application No. PCT/US2011/065691, Filing Date: Dec. 17, 2011, 11 pages.
International Search Report mailed Sep. 5, 2012 in PCT Application No. PCT/US2011/065692, Filing Date: Dec. 17, 2011, 8 pages.
International Search Report; Mailed Date: Aug. 31, 2012; Application No. PCT/US2011/064753; Filed Date: Dec. 14, 2011, pp. 8.
International Search Report; Mailed Date: Jul. 31, 2012; Application No. PCT/US2011/065285; Filed Date: Dec. 15, 2011, pp. 9.
Manage Subscription Products & Automate Recurring Billing Operations; Copyright 2008-2009; Retrieved Date: Jan. 12, 2010, 1 page.
Manifest Permission; Published Date: Jul. 21, 2004; 19 pages.
Meinrath et al.; "Unlicensed White Space Device' Operations on the TV Band and the Myth of Harmful Interferences", Mar. 2008, 13 pages.
Meinrath et al.; "White Space Devices & the Myths of Harmful Interference", 11 N.Y.U.J. Legis&Pub. Policy 495, 2008, 24 pages.
Menezes, Pascal; "Operating System Supporting Cost Aware Applications"; U.S. Appl. No. 13/844,932, filed Mar. 16, 2013; 57 pages.
Mist: Cellular Data Network Measurement for Mobile Applications; Published Date: Apr. 24, 2006; 9 pages.
Mobile Internet Usage Measurements—Case Finland; Published Date: Apr. 24, 2006; 140 pages.
Mohammed, "Web Service for User and Subscription Data Storage", U.S. Appl. No. 13/772,275, filed Feb. 20. 2013, 49 pages.
Motorola, "TV White Space Position Paper," 2008, 10 pages.
Non-Final Office Action mailed Jan. 4, 2013 in U.S. Appl. No. 12/960,730, 14 pages.
Non-Final Office Action mailed Oct. 2, 2012 in U.S. Appl. No. 12/967,638, 33 pages.
CN First Office Action for Application No. 201110400472.2, Feb. 27, 2014.
On First Office Action for Application No. 201110423068.7. Jan. 6, 2014.
CN Search Report for Application No. 201110408217.2, Nov. 4, 2013.
CN Search Report for Application No. 201110426187.8, Nov. 26, 2013.
"Second Office Action Issued in Chinese Patent Application No. 201110426179.3", Mailed Date: Aug. 5, 2014, 6 Pages, including partial translation.
Non-Final Office Action mailed Oct. 2, 2014 in U.S. Appl. No. 14/318,380, 5 pages.
Chinese Office Action mailed Sep. 9, 2014 in CN Patent App. No. 201110400433.2, 13 pages including partial translation.
Chinese Office Action mailed Sep. 2, 2014 in CN Patent App. No. 201110408217.2, 6 pages, including partial translation.
Final Office Action mailed Oct. 6, 2014 in U.S. Appl. No. 12/972,104, 10 pages.
Chinese Office Action mailed Jul. 11, 2014 in CN Patent App. No. 201110423031.4, 13 pages, including partial translation and/or concise explanation of relevance.
Notice of Allowance mailed Sep. 17, 2014 in U.S. Appl. No. 12/972,230, 7 pages.
Araujo, Joao Taveira et al., "Towards Cost-Aware Multipath Routing," AIMS 2009, LNCS 5637, 2009, pp. 207-210.
Haas, Robert et al., "Cost-and Quality-of-Service-Aware Network-Service Deployment," 2001, 6 pages.
Lun, Desmond S. et al., "Network Coding with a Cost Criterion," MiT LIDS Technical Report P-2584, Apr. 2004, 18 pages.
Non-Final Office Action mailed Sep. 29, 2014 in U.S. Appl. No. 12/748,829, 30 pages.
Notice of Allowance mailed Jul. 24, 2014 in U.S. Appl. No. 12/972,230, 7 pages.
Notice of Allowance mailed Sep. 3, 2014 in U.S. Appl. No. 12/970,159, 9 pages.
Pawar, Pravin et al. "Towards Location based QoS-Aware Network Selection Mechanism for the Nomadic Mobile Services," Dec. 5, 2009, 5 pages.
Hassan, Amer; "Cognitive Use of Multiple Regulatory Domains"; U.S. Appl. No. 14/458,203, filed Aug. 12, 2014; 58 pages including Preliminary Amendment filed Oct. 9, 2014.
Hassan, Amer; "Direct Connection With Side Channel Control"; U.S. Appl. No. 14/333,386, filed Jul., 16, 2014; 65 pages including Preliminary Amendment filed Sep. 26, 2014.
Notice of Allowance mailed Aug. 20, 2014 in U.S. Appl. No. 12/964,492, 13 pages.
Chinese Office Action mailed Sep. 2, 2013 in CN Patent App. No. 201110408217.2, 6 pages, including partial translation.
Chinese Office Action mailed Sep. 4, 2014 in CN Patent App. No. 201110423001.3, 6 pages, including partial translation.
Non-Final Office Action mailed Oct. 27, 2014 in U.S. Appl. No. 13/772,275, 14 pages.
Butler, "Leveraging Identity-Based Cryptography for Node ID Assignment in Structured P2P Systems", IEEE Transactions on Parallel and Distributed Systems, vol. 20, No. 12, Dec. 2009.
CN Search Report for Application No. 201110423068.7, Dec. 22, 2013.
CN First Office Action and Search Report for Application No. 201110423001.3, Text of the First Office Action included, Nov. 20, 2013.

(56) References Cited

OTHER PUBLICATIONS

CN First Office Action and Search Report for Application No. 201110423031.4, Text of the First Office Action included, Dec. 4, 2013.
Final Office Action mailed Dec. 4, 2014 in U.S. Appl. No. 12/960,730, 22 pages.
Final Office Action mailed Dec. 5, 2014 in U.S. Appl. No. 12/970,069, 21 pages.
Office Action dated Dec. 15, 2014 in CN Pat. App. No. 201110417153.2, 8 pages, including partial translation.
Final Office Action mailed Jan. 9, 2015 in U.S. Appl. No. 14/318,380, 8 pages.
"Office Action and Search Report Issued in Chinese Patent Application No. 201110400472.2", Mailed Date: Oct. 27, 2014, 14 Pages.
Final Office Action mailed Jan. 16, 2015 in U.S. Appl. No. 12/960,753, 12 pages.
Final Office Action mailed Jan. 28, 2015 in U.S. Appl. No. 12/970,034, 24 pages.
Chinese Office Action mailed Jan. 7, 2015 in CN Patent App. No. 201110400433.2, 10 pages including partial translation.

* cited by examiner

OPERATING SYSTEM SUPPORTING COST AWARE APPLICATIONS

RELATED APPLICATIONS

This application is a continuation of and claims benefit from U.S. patent application Ser. No. 12/972,230 that was filed on Dec. 17, 2010, and that is incorporated herein by reference in its entirety.

BACKGROUND

Many computing devices have connections to mobile networks that supply data services. Cellular telephones have evolved into "smart phones" that run applications, many of which send and receive data through a mobile data network. Concurrently, computing devices have evolved to take on form factors that make them easy for a user to carry. These computing devices also run application that send and receive data through a mobile data network.

As applications executing on mobile computing devices have gotten more powerful and more diverse, the bandwidth on mobile data networks consumed by these applications use has grown. In addition to increases in the number of mobile devices connected to mobile networks and increases in the number of applications available for execution on these mobile devices, data usage has also increased as a result of changes in the way these applications use data. Applications may now consume network bandwidth engaging in functions such as sending and receiving e-mail, streaming music or video to a mobile device or accessing data over the Internet.

In response to the growing usage of network bandwidth, mobile network operators have begun to revisit their policies for charging for network data usage. While, in prior years, it was common for unrestricted data usage to be available for a fixed monthly fee, it is now more prevalent for data networks to be metered. In metered networks charges are imposed based on usage. Though, various charging policies have been proposed.

For example, in a variable charging policy, a charge may be imposed for each unit of data transmitted or received by a mobile device. A variation of a variable charging policy may cap the total fee per month such that, once usage exceeds a threshold, additional charges are not incurred. In a fixed charging policy, a service plan may have a monthly usage cap. Usage up to the cap may be covered by the fixed price, but usage above the cap may be charged as in a variable policy. In a variation on the fixed charging policy, there may be no additional charge for usage one the cap is exceeded, but the network may throttle data transmissions above the cap such that a user who exceeds the cap may experience reduced service.

SUMMARY

To enhance an experience for a user of a mobile computing device, current network information indicating a current basis for usage charges may be made available to an application or other user mode component executing on the mobile computing device. The application may then selectively execute network operations, which may include determining whether the network operations should be performed, either with or without modification, based on an impact of the operation on charges the user may incur for data usage. In making this determination, the application may have available information on the importance of completing the operation or completing the operation in a timely way. Accordingly, a cost aware user mode component may trade off cost and importance.

Information on the current basis for usage charges may be made available through an application programming interface presented by a service executing on the mobile computing device. The service may obtain information on a policy for charging for data usage from a mobile network operator. The service may also obtain information on data usage from the mobile network operator, along with values of other parameters that may be used by the application in determining how to selectively execute the network operation. Though, in some embodiments, usage information may be obtained in other ways, such as monitoring network traffic.

The service may obtain information from a server provided by an operator of the mobile network. Such a server may supply information to a mobile computing device, including, for example, a value defining the mobile network operator's policy for charging for data usage and a value indicating an amount of data used by the mobile computing device.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
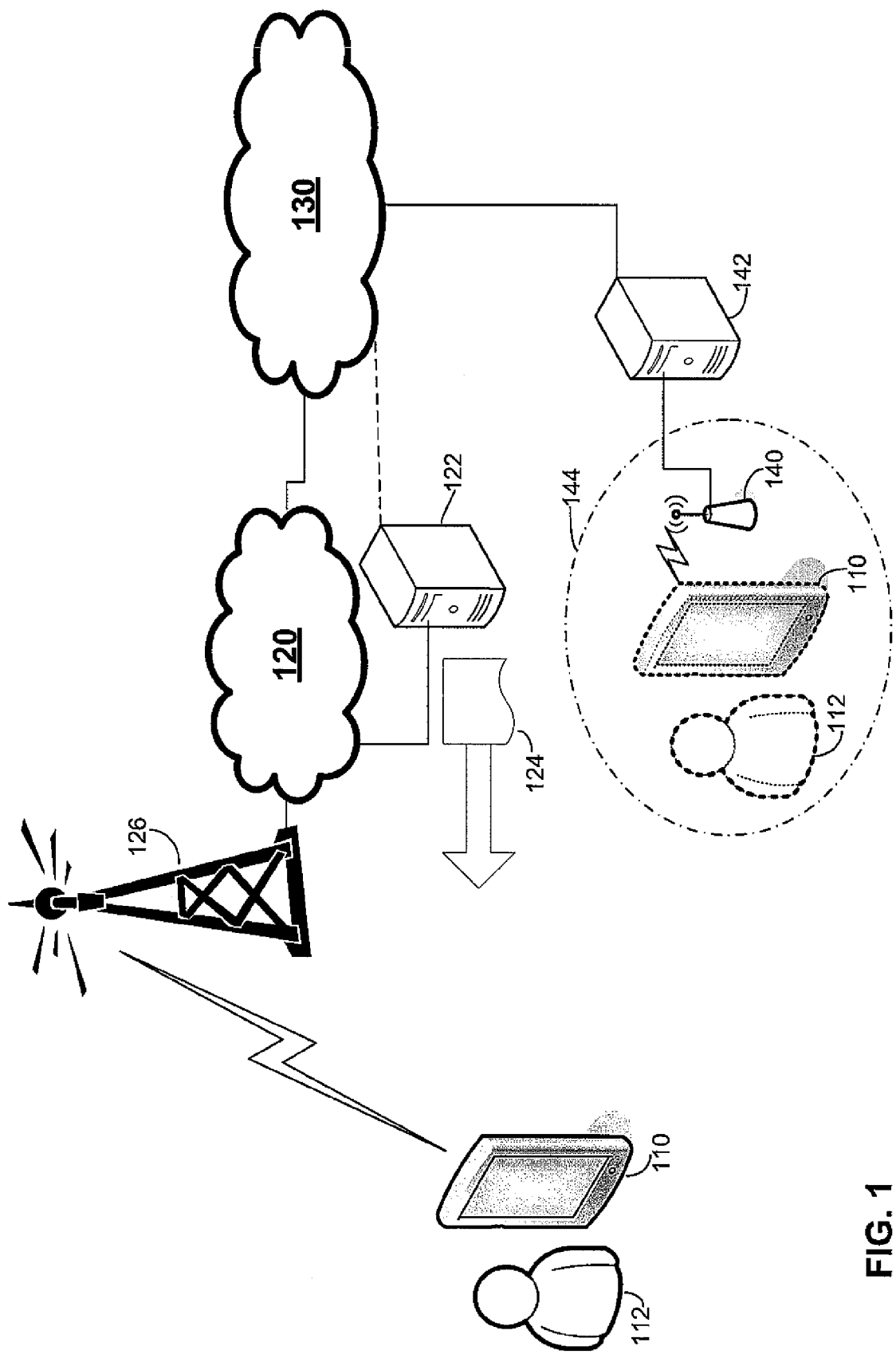
FIG. 1 is a sketch of an exemplary environment in which embodiments of the invention may operate.

The Inventors have recognized and appreciated that the onset of new types of charging policies for mobile data usage may be a burden on users of mobile computing devices. Users may misjudge the amount of their accumulated usage over a billing period and inadvertently incur charges for over-cap usage or have their data transmissions throttled. In either event, the user's experience may be degraded, either because of "surprise" charges or because on unexpectedly poor performance of the computing device when attempting operations that entail data transmissions.

Moreover, as mobile applications become more powerful, more applications may autonomously initiate actions that consume network bandwidth. Such operations may be performed in a background mode of operation of the computing device, such that a user may not even be aware that those operations are occurring and consuming network bandwidth. Applications that synchronize with data stores on a network, for example, may periodically exchange data over the network with those data stores. Such applications may include e-mail servers or software update services. Exchanges of information by these applications may occur in background mode without express user input.

To avoid detracting from an experience for a user of a mobile computing device, an operating system may be provided to facilitate cost aware applications. The operating system may provide a service from which applications, and other user-mode components, may obtain current network information, including information that identifies a basis by which usage charges for the network may be computed. This information, for example, may allow an application to determine an impact of a contemplated operation and selectively execute or modify the operation based on the determined impact.

The impact, for example, may be computed as a charge incurred for the specific operation, if performed. Though, other types of impact alternatively or additionally may be computed. These impacts may include an amount of usage as a percentage of a usage cap, or percentage of the amount remaining until the cap is reached, that will be consumed by the operation.

Regardless of the specific format in which the impact is determined, a cost aware application may use this information to determine whether and how network operations that will consume bandwidth will be performed. The application, for example, may determine that the operation is to be immediately executed over a metered network. Alternatively, the application may determine that the operation is to be performed at a later time or deferred until an un-metered or lower cost network is detected. In making such determinations, the cost aware application may take advantage of information that may be available to the application, such as information about the importance of completing the operation or a cost associated with deferring completion.

A service may obtain information from any of a number of sources in order to be able to supply it to a user-mode component. In some embodiments, the information may be obtained from a mobile network operator. The mobile network operator may operate a server for this purpose that makes information available to the service on the mobile computing device. Such information may include, for example, information that identifies a charging policy applicable to the mobile computing device that the mobile network operator uses to compute data charges. Alternatively or additionally, the information may specify prior usage by the computing device. Administrative information may also be available, such as a date on which a measure of cumulative usage toward a cap is reset.

The service may also gather some or all of the information, such as by obtaining usage information through monitoring. For this purpose, the service may incorporate a monitoring component that interfaces to portions of the operating system that manages network communications. The monitoring component, for example, may interface to a network stack. Through such an interface, the monitoring component may obtain usage information relevant to a specific network over which data is transmitted.

Additionally, the monitoring component may obtain information about a user-mode entity associated with data communicated over the network. The monitoring component may record this information in association with any suitable user-mode entity or category of user-mode entities that may be useful in monitoring network usage. For example, the monitoring component may record usage information associated with a specific application or service, user account or type of application.

Alternatively or additionally, a service of a cost aware operating system may determine and enforce a policy related to data usage based on cost-related criteria. Such a policy may specify criteria that, when apply, indicate whether a network operation is to be performed, modified or canceled. These criteria may be based on one or more factors, such as charges that would be incurred by performing an operation, a tag attached to data for transmission by an applicant generating the data or usage limits specified by a user.

Such policy information may be obtained in any suitable way. In some embodiments, the service may provide a user interface through which a user may specify usage limits or other aspects of a data usage policy for specific applications or classes of applications.

To enforce decisions on data usage, one or more enforcement mechanisms may be incorporated in the operating system. Such an enforcement mechanism may be incorporated into a component that establishes network connections at the application level. Such a component may be used to block the creation of a connection or to break down a connection when a user-mode component using that connection violates a data usage policy. Alternatively, enforcement may be through a firewall or similar component, which can be set to block or throttle data packets to or from a user-mode component that is operating outside of a data usage policy applied to that component.

FIG. 1 illustrates an environment in which a computing device with a cost aware operating system may operate. FIG. 1 illustrates a computing device 110. In this example, computing device 110 is operated by a user 112. Computing device 110 may be carried by user 112 to multiple locations, and computing device 110 may communicate wirelessly through one or more access networks at each of those locations. In this example, computing device 110 has a tablet form factor, which may be easily carried by a user. Though, it should be appreciated that form factor of the computing device is not critical to the invention.

In the example of FIG. 1, computing device 110 includes one or more radios that support communication over multiple access networks through which computing device 110 may access the Internet 130. Through the Internet 130, computing device 110 may further access any of a number of sources of data, such as websites, corporate networks or any other networks connected to Internet 130. For simplicity, those sources of data are not expressly indicated in FIG. 1.

In the example of FIG. 1, computing device 110 is equipped to access Internet 130 through a mobile broadband network. Such a network may be operated, for example, by a cellular carrier or other mobile network operator. In this example, the mobile network operator maintains access network 120. Access network 120 may be accessed by mobile computing devices through base stations, of which base station 126 is illustrated in FIG. 1. Access network 120 and base station 126 may be implemented using conventional components or in any other suitable way.

Base station 126 may include a transmitter/receiver to support communications with mobile computing device 110. This transmitter/receiver is coupled to access network 120, through which communications may be routed to and from Internet 130. In this way, mobile computing device 110 may exchange data with any device or other network reachable through Internet 130 through access network 120.

The mobile network operator that operates access network 120 may impose a charge for using access network 120. The charging policy applied to data transmissions sent from or destined for computing device 110 may depend on any of a number of factors. Those factors may include a specific subscription plan elected by user 112. Other factors may include amounts of data previously communicated through access network 120 for computing device 110 during an applicable charging interval. For example, the charging policy may impose different charges for data usage that exceeds a predetermined threshold during a monthly billing cycle. Though, it should be appreciated that many factors, alternatively or additionally, may be used to determine specific charges that will be incurred for data usage in performing an operation involving transmission of data through access network 120. Different mobile network operators may have different charging policies that weight these factors differently. Some mobile network operators may have different charging policies for different users based on a subscription agreement with those users.

To facilitate control over the operation of computing device 110 in a way that is cost aware, computing device 110 includes a cost aware operating system. Such a cost aware operating system may receive information on a charging policy imposed by the mobile network operator.

The cost aware operating system may obtain information related to the charging policy of the mobile network operator and network data usage, in any of a number of ways. In some embodiments, some or all of this, and possibly other, data cost information used by a cost aware operating system within computing device 110 may come from the mobile network operator. In the embodiment of FIG. 1, the mobile operator maintains a server 122 that is configured to supply such information to mobile computing device 110.

Some or all of the data cost information, for example, may be communicated to computing device 110 over a control channel for the mobile broadband network. As a specific example, such information may be communicated over an SMS channel or other suitable control channel. Alternatively, or additionally, server 122 may be coupled directly to Internet 130. Such a connection may allow mobile computing device 110 to obtain data cost information through any other connection mobile computing device 110 may form to internet 130. For example, user 112 may from time-to-time connect mobile computing device 110 to a wired network through which Internet 130 may be accessed. In such a scenario, some or all of the data cost information may be accessed through that wired connection.

Accordingly, it should be appreciated that the timing and manner in which mobile computing device 110 obtains data cost information is not critical to the invention and any suitable mechanism or combination of mechanisms for obtaining that information may be employed. As a specific example, mobile computing device 110 may obtain charging policy information and information on prior usage in different ways. Policy information, for example, may be loaded into mobile computing device 110 when the device is initially configured to use a mobile broadband network. The charging policy information may be updated from time-to-time when mobile computing device 110 has ready access to Internet 130. Though, information on prior data usage, which may change frequently, may be communicated wirelessly through access network 120. Communication of such dynamically changing information may be initiated by server 122 or by mobile computing device 110.

Regardless of the timing and manner in which data cost information is communicated, the information may be communicated in any suitable format. For example, a mobile network operator may define a format for data cost information records. A cost aware operating system within mobile computing device 110 may be programmed to recognize the format and associate values with specific parameters of the data cost information. Alternatively or additionally, the information may be associated with tags or other identifiers, allowing a cost aware operating system to associate values with specific parameters of data cost information based on the tags associated with the individual values. Accordingly, it should be appreciated that the format in which data cost information is communicated to mobile computing device 110 is not critical to the invention.

Server 122, for example, may be coupled to access network 120, such that data cost information may be communicated wirelessly to computing device 110 through base station 126 in a format similar to a format used to communicate other types of data to computing device 110. Though, the specific mechanism by which data cost information is communicated to computing device 110 is not a requirement of the invention.

Server 122 may obtain the data cost information in any suitable way. Information on a data charging policy, for example, may be established by the mobile network operator as part of one or more subscription plans offered to subscribers of the mobile network. The mobile network operator may associate a specific plan with mobile computing device 110 when user 112 enters into a subscription with the mobile network operator. The terms of such a subscription may determine the data charging policy applicable to computing device 110. Accordingly, server 122 may obtain data charging policy information from other components, not expressly illustrated in FIG. 1, used in administering the mobile network.

Server 122 may obtain information on past data usage by mobile computing device 110 in any suitable way. Server 122 may monitor data traffic associated with mobile computing device 110 as that data traffic passes through access network 120. Though, information relating to past data usage may be tracked by billing components or other conventional components within a mobile network. Accordingly, server 122 may obtain information on past data usage associated with computing device 110 from other components, not shown, of the mobile network.

Regardless of how data cost information is obtained, a cost aware operating system may use this information in any of a number of ways. The operating system may, for example, use this information to enforce data usage policies applicable to applications or other user mode components executing on computing device 110. Alternatively or additionally, the cost aware operating system may provide cost related information on data usage to cost aware applications or other user mode components. The applications or other user mode components may then use such information for determining whether and how to perform network operations. Such that network operations are selectively performed based on cost.

One way in which a cost aware application may selectively perform a network operation is to defer the operation until a later time when the operation can be performed at a lower cost. In embodiments in which a charging policy imposes different charges based on data usage at different times of the day, deferring the operation until a lower cost time of day may be appropriate. Alternatively, mobile computing device 110 may be configured to connect to different types of networks.

A cost aware operating system may maintain data cost information for each network and may use this data cost information to identify a lower cost network for performing a specific network operation. Accordingly, deferring a network operation may entail delaying execution of the operation until mobile computing device 110 is connected to a lower cost network and then performing the operation over the lower cost network.

In the example of FIG. 1, mobile computing device 110 is configured to perform operations involving exchanges of data through a mobile broadband network. It is also configured for connecting wirelessly to a local area network that may in turn be coupled to Internet 130. Such a capability, for example, may be provided by equipping mobile computing device 110 with a Wi-Fi capable network interface card. Though, in contrast to a mobile broadband network, such a local area network connection is inherently location dependent.

FIG. 1 illustrates a location 144 at which mobile computing device 110 may form a wireless connection through access point 140 to a local area network. Location 144 may represent the home or office of user 112 or a public "hot spot" or other suitable location where an access point is in range. In this example, access point 140 is coupled through server 142 to Internet 130. Accordingly, when user 112 takes mobile computing device 110 to location 144, mobile computing device 110 may perform operations involving data exchanges through access point 140. If the cost of exchanging data through access point 140 is less than the cost of exchanging data through access network 120 of the mobile broadband network, a cost aware application may perform a deferred operation involving data exchange when mobile computing device is in location 144 or other suitable location where such a low cost network connection is available.

Figure 2:
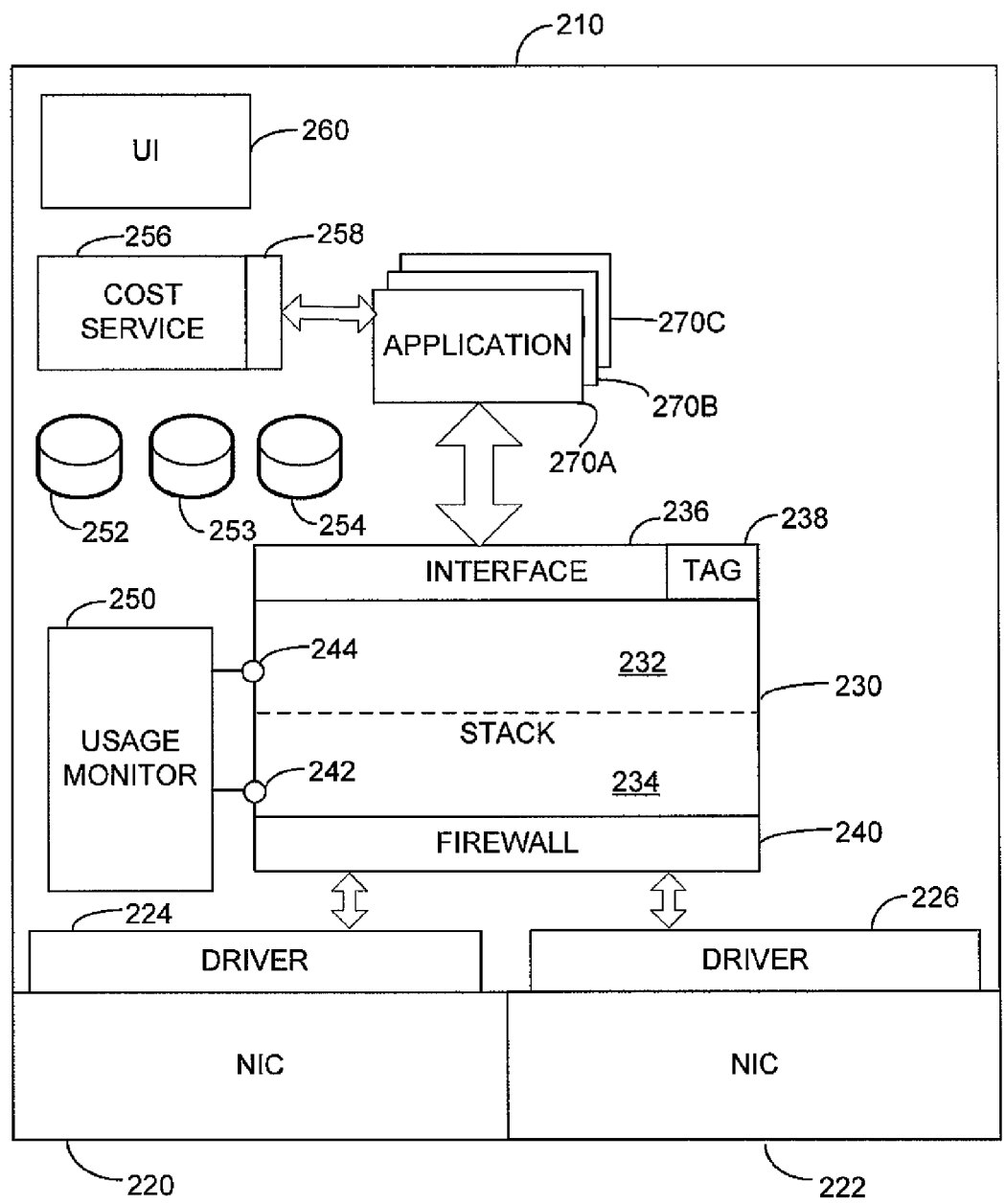
FIG. 2 is a functional block diagram of an exemplary computing device incorporating a cost service.

Turning to FIG. 2, an example of an architecture of a mobile computing device 210 that incorporates a cost aware operating system and cost aware user mode components is provided. FIG. 2 shows that mobile computing device 210 is configured to interface to multiple networks. In this example, a network interface card 220 and a network interface card 222 are illustrated. Each network interface card may support connections to a different network. For example, network interface card 220 may be a Wi-Fi network interface card as is known in the art. Such a network interface card may support a connection to a local area network, such as the connection through access point 140 illustrated in FIG. 1.

Network interface card 222 may be configured for communication over a mobile broadband network, such as a connection through base station 126 illustrated in FIG. 1. Network interface cards 220 and 222 may be implemented using techniques as are known in the art.

Each of network interface cards 220 and 222 may be controlled through software, illustrated as driver 224 and driver 226. Each of drivers 224 and 226 may be configured to control specific operations of its associated network interface card. Those operations may include transmitting and receiving data. Such control may be performed using techniques as are known in the art. Though, the specific mechanism by which transmission and reception occurs is not critical to the invention, and any suitable techniques may be used.

In operation, drivers 224 and 226 interface with components of an operating system of mobile computing device 210. The operating system serves as an intermediary between the drivers and one or more user mode components that generate or use the data exchanged through network interface cards 220 or 222. In this example, user mode components are indicated as applications 270A, 270B and 270C. Though, it should be recognized that any number of applications that send or receive data may execute on mobile computing device 210. Additionally, operating system services or other user mode components within the operating system may similarly send or receive data. Accordingly, applications 270A, 270B and 270C are exemplary and not limiting of the types of user mode components that may send or receive data.

In the example of FIG. 2, the operating system of mobile computing device 210 is shown to include stack 230 to pass data for transmission from applications 270A, 270B or 270C to one of the network interface cards 220 or 222. In reverse, data received at network interface cards 220 or 222 may be processed within stack 230 and made available to one of the applications 270A, 270B or 270C. In the embodiment illustrated, stack 230 may be implemented using conventional techniques.

Stack 230 may perform operations such as receiving data for transmission from one of the applications 270A, 270B or 270C, partitioning that data into packets and attaching appropriate headers to the packets. Stack 230 may then transfer such packets to one of the drivers 224 or 226 for transmission through an associated network interface card 220 or 222, respectively. The specific format of each packet and the driver to which the packets are applied may be determined by stack 230. For example, an application may request that stack 230 establish a connection to a remote device. Stack 230 may form such a connection by exchanging communications with that remote device over a network to which one of the network interface cards 220 or 222 is connected. The format of the packets may then be determined by characteristics of the network. In some instances, the network interface card selected by stack 230 for forming the connection may be selected based on the networks over which the remote device is accessible. Though, when the remote device is accessible through multiple networks, the network through which the connection is established may depend on user preferences or relative performance of the networks over which the remote device may be reached. Such selection techniques are known in the art. In embodiments in which the operating system of computing device 210 is cost aware, the relative cost of communicating over each network may also be a factor in selecting a network for establishing such a connection.

Regardless of the specific approach used to select the network used for a connection, once that connection is established, the application may provide stack 230 with data for transmission through that connection. In providing data for transmission over a connection, an application need not specify a network over which that data will be communicated. Rather, stack 230 may process the data and format it as appropriate for transmission over the network associated with the connection.

Similarly, for connectionless protocols, such as UDP a user mode component may request transmission to an end point. Stack 230 may then apply known techniques to select a network and appropriate format for communication with that end point.

Stack 230 may perform such processing in stages. A first stage, which may be performed in upper stack portion 232, may be independent of the specific network over which the data is to be transmitted. Any processing that depends on the network over which the data is to be transmitted may be performed in lower stack portion 234. Processing in lower stack portion 234, for example, may include selecting an appropriate driver to which packets for transmission are routed. Though, any other suitable processing may alternatively or additionally be performed in lower stack portion 234.

Data received over networks to which network interface cards 220 and 222 are connected may also be processed through stack 230. For received data, stack 230 processes the data and makes it available to an appropriate one of the applications 270A . . . 270C. That processing may entail network specific processing, which may be performed in lower stack portion 234, and network independent processing, which may be performed in upper stack portion 232. In each case, though, the processing in each stack portion may be performed using techniques as are known in the art.

FIG. 2 illustrates multiple ways in which the operating system of mobile computing device 210 may be cost aware. In the illustrated example, the operating system includes a cost service 256. Here, cost service 256 maintains multiple data stores, data store 252, data store 253 and data store 254. Data store 252 may contain information on data charging policies of networks to which computing device 210 can connect. Though FIG. 1 illustrates a mobile computing device is connected to only one mobile broadband network, a user may have subscriptions to multiple networks, and data store 252 may contain information on multiple such networks.

Data store 254 may contain information on data usage. The information in data store 254 may be organized in any suitable way. In some embodiments, data store 254 may contain aggregate usage information for one or more networks to which computing device 210 can connect. In other embodiments, the data usage information in data store 254 may be stored only for networks for which there is a corresponding charging policy in data store 252. Though, other criteria, including express user input, may be used to determine networks for which data usage information may be stored.

Instead of or in addition to storing aggregate data usage over a network, data store 254 may store information on data usage by user mode components. This information may be stored to record data usage by individual user mode components, such as applications 270A, 270B or 270C. Alternatively or additionally, information in data store 254 may be organized to show data usage by classes of user mode components. For example, all of the components of an operating system may be treated as a class, and information about data usage by operating system components may be stored in a single record in data store 254.

Storing data usage information in connection with user mode components may allow a cost aware operating system and/or cost aware applications to manage network operations based on data usage and data usage policies applicable to specific user mode components. To support such behavior, the cost aware operating system may include a further data store 253. Data store 253 may contain data usage policies applicable to one or more user mode components. In some embodiments, data usage policies may be provided for individual user mode components or classes of user mode components. Such data usage policies may be obtained in any suitable way. In some embodiments, information and data store 253 may be downloaded into data store 253 by and administrator of mobile computing device 210. Though in other embodiments, data usage policies may be obtained by cost service 256 through user interface 260. Through user interface 260, cost service 256 may obtain policy information from a user of mobile computing device 210.

Regardless of the mechanism by which cost service 256 obtains the information in data stores 252, 253 and 254, cost service 256 may use this information to facilitate cost aware operation of mobile computing device 210.

As described above in connection with FIG. 1, data cost information of the type maintained in data stores 252 and 254 may be obtained from mobile network operators. Such information may be obtained through data transmission received through either network interface card 220 or 222 and passed through stack 230 to cost service 256. In such an operation, cost service 256 may receive such data cost information using communication techniques appropriate for any other user mode component. Regardless of how cost service 256 receives the information, it may store the data cost information in data stores 252 and 254 in any suitable format.

FIG. 2 illustrates an alternative mechanism by which data usage information may be obtained. In this example, the cost service includes a usage monitor component 250. In this example, usage monitor component 250 interfaces with stack 230. As stack 230 processes transmitted or received data, it may provide information about the amount of data transmitted or received, the network over which the data was transmitted or received and the user mode component that generated or received that data. Such information may be used to populate data store 254 with data usage information. The information obtained through usage monitor 250 may therefore be used instead of information obtained from a mobile network operator.

In some embodiments, information from usage monitor 250 may be used in conjunction with information obtained from a mobile network operator. For example, cost service 256 may obtain data usage information from a mobile network operator at relatively long intervals. Between those intervals, data usage information generated by usage monitor 250 may be used to provide more up-to-date information. Alternatively, data usage information collected by usage monitor 250 may be the predominant source of information on data usage. However, from time-to-time, data usage, as recorded by usage monitor 250, may be compared to data usage as reported by a mobile network operator. Discrepancies between the two techniques for measuring data usage may be resolved. For example, information in data store 254 acquired by usage monitor 250 may be updated such that data usage as measured by usage monitor 250 tracks data usage as reported by a mobile network operator.

In some embodiments, usage monitor 250 may acquire information about data usage that is not available to a mobile network operator. As one example, usage monitor 250 may have access to information both about a network over which data is transmitted or received and a user mode entity that is transmitting or receiving that data. Though a mobile network operator may have access to information about data usage, the mobile network operator may not necessarily be able to associate data transmitted through access network 120 with a specific user mode entity within computing device 210. To obtain such information, usage monitor 250 may be coupled to one or more locations in stack 230 where network information and user mode component information is available.

In the embodiment illustrated in FIG. 2, usage monitor 250 is coupled to upper stack portion 232 through extensibility point 244. In upper stack portion 232, information about a user mode entity, such as an application or other user mode component that has requested data transmission or is the destination for data received over a network is available. The user mode component may be identified in any suitable way, such as the full path of the executable component that implements that user mode component or a digital signature associated with the executable. Regardless of how the user mode component is identified, the identification provides a mechanism for usage monitor 250 to associate information on data transmitted over a network with a specific user mode component.

In some embodiments, upper stack portion 232 may perform processing that is independent of a network over which data is to be transmitted or has been received. Accordingly, usage monitor 250 may also be coupled to lower stack portion 234 where information about the network may be available. In this example, usage monitor 250 is coupled through extensibility point 242 to lower stack portion 234. Usage monitor 250 may correlate information received from lower stack portion 234 about a network with information received from upper stack portion about a user mode component to enable usage monitor 250 to generate data usage information on an application-by-application basis.

Any suitable technique may be used to implement extensibility points within stack 230. Though, extensibility points may be implemented using techniques that are known in the art. Extensibility points, such as extensibility points 242 and 244, may be incorporated into a stack 230 in other contexts, such as to allow anti-virus software to interface with stack 230. Through such extensibility points, stack 230 may provide information about packets being processed for transmission or upon receipt over a network. Additionally, through such extensibility points, external components may provide commands to stack 230, which may influence processing of received packets or packets to be transmitted. In the case of usage monitor 250, extensibility points 242 and 244 may be used only to acquire information. Though, other aspects of a cost aware operating system may use extensibility points 242 or 244 to control operation of stack 230 based on data cost information.

Regardless of the manner in which information is loaded into data stores 252, 253 and 254, cost service 256 may use this information in one or more ways. Cost service 256, for example, may access data stores 252, 253 and 254 to provide information to cost aware applications, which then may alter the way in which they perform network operations based on cost information. Alternatively, cost service 256 may use the information in data stores 252, 253 and 254 to directly control the performance of network operations.

To support provision of cost information to cost aware applications, or other user mode components, cost service 256 may have an application programming interface 258. A cost aware application may, prior to performing a network operation, place a call through application programming interface 258 to obtain cost information. In response to such a call, cost service 256 may provide to the cost aware application any information from any of the data stores 252, 253 and 254.

Alternatively or additionally, cost service 256 may compute values of cost parameters applicable to the specific application making the call through application programming interface 258. As one example, a cost aware application making a call through application programming interface 258 may identify a network adapter and specify an amount of data to be transmitted through that network adapter. Based on information maintained by the operating system, cost service 256 may identify a network currently associated with the network adapter. Cost service 256 may access data store 252 to obtain the data charging policy for that network. Because the policy may specify different approaches to computing a charge for data transfer based on whether usage of that network is above or below a cap, cost service 256 may access data store 254 to determine prior data usage over that network. By combining this information, cost service 256 may determine the basis for which a charge will be imposed for the data to be transmitted. The basis for computing the charge may be communicated to the cost aware application in response to a call through application programming interface 258.

Though, this charging basis information may be presented in other formats. In some embodiments, a call through application programming interface 258 may include information about an amount of data to be transmitted. In that scenario, information about the basis for computing a charge may be reflected in a computation of the incremental charge that will be incurred by transmitting the specified amount of data over the network. As yet another possibility, application programming interface 258 may return information defining a charging policy and prior data usage.

Though, it should be appreciated that any suitable data cost information may be made available through application programming interface 258 and that information need not be provided directly in response to call on the interface. As an example of one possible variation, application programming interface 258 may support a registration of user mode components to receive notifications when networks of specified cost characteristics are available. For example, as described above in connection with FIG. 1, an action that a cost aware application may take is deferring transmission of data until a low- or no-cost network is available. Accordingly, application programming interface 258 may support a registration by which a user mode component specifies desired network cost characteristics. A user mode component may specify, for example, a no-cost network. Cost service 256 may monitor the available networks to which mobile computing device 210 is connected. Using the information in data stores 252 and 254, cost service 256 may determine, for each network, the cost characteristics of that network. Upon detecting a network meeting the desired cost characteristics specified by the registered user mode component, cost service 256 may notify the user mode component of the availability of a network meeting the desired cost characteristics. In this way, a cost aware application may defer certain operations that it determines would cost too much if performed over a current network until such time as a lower priced network is identified.

In addition to using the information in data stores 252, 253 and 254 to provide information to cost aware user mode components, cost service 256 may control the manner in which operations involving communication of data over a network are performed based on data cost information. In the embodiment of FIG. 2, cost service 256 has access to data store 253 that contains data usage policies. Each policy may specify conditions under which data is to be transmitted or received. Data usage policies may also specify such policy information generically, as applicable to all components. Alternating or additionally, usage policies may be specified for individual user mode components or classes of user mode components. Such notices may specify conditions under which data is to be transmitted or received, subject to one or more constraints, such as constraints on time of transmission, cost of network for transmission or data rate used for such a transmission. Accordingly, cost service 256 may access data store 253 to obtain a data use policy for one or more user mode components, and determine whether to allow, block or restrict data transmissions from or to the user mode components. To the extent any such policy depends on a current charging basis for a network, service 256 may access data usage information from data store 254 and determine, for one or more networks to which mobile computing device 210 is connected, a current basis for computing charges for incremental amounts of data transferred over that network.

In embodiments in which cost service 256 determined the manner in which data may be transmitted or received, cost service 256 may interface with one or more enforcement components to implement such a determination. In the example of FIG. 2, those enforcement components are within mobile computing device 210. As one example, firewall 240 is shown.

Firewall 240 may be a component as is known in the art that can block the transmission or reception of packets. Firewall 240 may be configured to block or restrict the transmission of data on a user mode component-by-component basis. In scenarios in which cost service 256 determines that allowing an application component, for example, to further transmit data over a network, cost service 256 may configure firewall 240 to block transmissions from that application. In some scenarios, firewall 240 may be configurable to allow transmissions from identified user mode components, but to restrict the data rate for those transmissions, such that the transmissions are "throttled." Accordingly, firewall 240 is an example of an enforcement mechanism that cost service 256 may employ to enforce a data usage policy for a specific user mode component or class of user mode components.

Other enforcement mechanisms may alternatively or additionally be included. As an example of one possible alternative, cost service 256 may interface with stack 230 to enforce a data usage policy. Cost service 256 may interface with stack 230, for example, through extensibility points, such as extensibility points 242 and 244. Through such extensibility points, cost service 256 may obtain information about data being transmitted or received. Cost service 256 may, in response to such information, provide commands to stack 230 through extensibility points 242 or 244. Those commands may indicate whether a data packet is to be passed by stack 230. In this way, transmission of data over a network may be blocked or throttled. Alternatively or additionally, commands provided by cost service 256 may control stack 230 to change the network over which one or more data packets is to be transmitted. For example, though an application component 270A . . . 270C specifies transmission through a network adapter associated with a metered network, when cost service 256 determines that transmission over that metered network would violate a data usage policy associated with the application generating the data, cost service 256 may generate commands to stack 230 causing the data packets from that application component to be transmitted over an alternative, non-metered network.

Through extensibility points, cost service 256 may also impact the amount of data sent to computing device 210, which may also incur data usage charges. As one example of an enforcement mechanism that may be employed to reduce the amount of data sent to mobile computing device 210, cost service 256 may generate a command to stack 230 to break down a network connection. Breaking down the connection may block transmission of data by an external device directed to a user mode component executing on mobile computing device 210.

In addition to obtaining data usage policy information from data store 253, cost service 256 may obtain data usage policy information in other ways. As one example, data usage policy information may be transferred from a user mode component to cost service 256. FIG. 2 provides an example of a mechanism by which such a transfer of data usage policy information may be transferred from a user mode component to cost service 256. In this example, that information is transferred based on the value of a tag 238 generated by the user mode component. As shown, a user mode component, such as applications 270A . . . 270C may access stack 230 through interface 236 to initiate transmission or receipt of data over a network. Interface 236 may accept a tag 238 associated with a request for data transfer or a request to establish a connection. The value of tag 238 may specify a priority associated with data to be sent or received to the application component. Cost service 256 may use this value to determine a specific action for processing network operations associated with the transmission or receipt of data for the application component.

As a more specific example, if the value of tag 238 indicates that data transmission is of high priority, cost service 256 may establish or maintain the connection for transfer of data to or from that application component even if there is an incremental cost associated with transmission of such data. Alternatively, if the value of tag 238 indicates a relatively low priority, cost service 256 may break down a connection involving that application component to block transmission of data from that application component and further receipt of data directed to that application component over a network for which further transmissions will incur data usage charges. As yet another example, a value of tag 238 may indicate a medium priority associated with data transmission for an application component. Accordingly, cost service 256 may allow such transmissions to continue so long as the incremental cost associated with the data transfer is below a threshold. However, when the incremental cost for further transmission exceeds a threshold, cost service 256 may block further transmissions.

In this example, three priority values for tag 238 were described. It should be appreciated, though, that tag 238 may take on any number of values and cost service 256 may be programmed to respond to each such possible value differently.

Also, it should be recognized that, though FIG. 2 illustrates that processing associated with network costs may be performed in a separate component, cost service 256 need not have any special form. For example, functions of cost service 256 may be integrated with network stack 230 or other components within an operating system.

Figure 3:
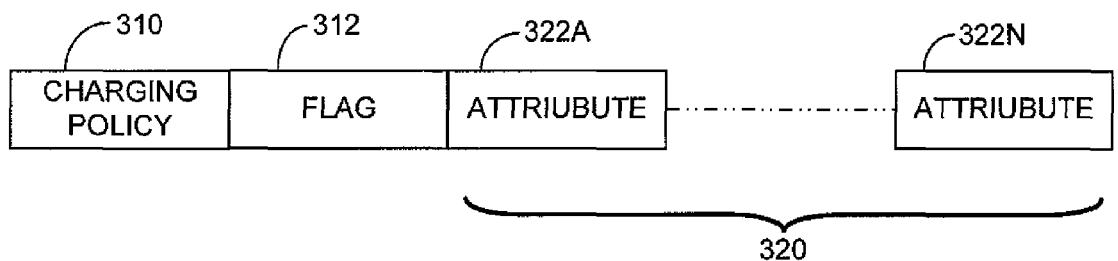
FIG. 3 represents an exemplary application programming interface (API) provided by the cost service of FIG. 2.

Turning to FIG. 3, an example of information that may be provided through application programming interface 258 is illustrated. In the example of FIG. 3, application programming interface 258 contains multiple fields, each containing information returned to a user mode component making a request for data cost information through application programming interface 258. In the embodiment illustrated, the information in each of the fields may be tailored to the current operating state of mobile computing device 210 as it relates to a specific network for which information may have been requested. Accordingly, a portion of the information returned through application programming interface 258 may indicate a current basis for the identified network to compute a charge for incremental data usage. In this example, the information indicating a current basis for computing a charge is reflected by a combination of the information in fields 310 and 312.

In this example, field 310 includes information about a charging policy for the network. A value in field 310 may indicate, for example, that the identified network is unrestricted, meaning that the mobile network operator does not impose an additional charge for incremental data usage. Alternatively, a value in field 310 may indicate that the charging policy of the network is a fixed type charging policy, meaning that there is no additional charge for data usage up to a specified cap, but there may be an incremental charge for data usage above the cap. As a further example, a value in field 310 may indicate a variable charging policy for the identified network, meaning that the mobile network operator imposes a charge for each unit of data transmitted over the network.

In addition, field 312 may contain a value of a flag, indicating a current charge state for the identified network based on prior data usage. Field 312 may take on different values, depending on the charging policy indicated in field 310. The value of the flag in field 312 may indicate that an amount of prior data usage has occurred such that a usage cap for the identified network has been exceeded and a mobile network operator may be imposing a charge per unit of data transmitted. Such a value may be appropriate for a network using a fixed-type charging policy.

As another example, a value in field 312 may indicate that the identified network is being throttled. Such a value may be appropriate for a network using a fixed-type charging policy in which, upon exceeding a cap, data transmissions are throttled.

As yet another example, a value in field 312 may indicate that mobile computing device 310 is in a roaming mode. Such a value may indicate that computing device 210 is outside of the home service area for the mobile network operator with which a user of mobile computing device 210 has a subscription. In a roaming mode, information on network data usage or other elements of data cost information may be unavailable from the mobile network operator with which the user has a subscription. A cost aware user mode component may treat such information as indicating that the identified network is imposing a charge for each increment of data transmitted and that this charge is imposed at a high rate. Cost aware user mode components may use this information to determine that network transmissions of all but the highest priority information should be blocked or routed to an alternative network.

FIG. 3 illustrates that, in connection with the information in fields 310 and 312, which collectively provide information on a basis for which an identified network is imposing an incremental charge for data transmission, user interface 258 may provide attributes 320 of the charging policy in effect for the identified network. A cost aware user mode component may use the attributes 320 to determine processing for network operations that may entail data transmissions.

In the example of FIG. 3, attributes 322A . . . 322N are illustrated. Any number of attributes may be provided through application programming interface 258. An example of an attribute that may be passed through the interface is an attribute indicating prior data usage. Such an attribute may indicate the amount of data previously transmitted over a network during a current billing cycle for a subscription to the identified network. Such information may be obtained from data store 254 or any suitable source. The attribute may indicate total data usage for the identified network. Alternatively or additionally an attribute may indicate only data usage by the user mode component requesting information through application programming interface 258 or aggregated usage by user mode components in the same category as the user mode component requesting information through application programming interface 258.

Another attribute that may be included among attributes 320 is a cap threshold. For a network with a fixed type charging policy, the value of this attribute may indicate a threshold above which a per unit charge is imposed, the transmission rate is throttled or some other characteristic of network charging or operation changes.

A further attribute may be a time stamp. A value of the time stamp attribute may indicate when values for the information conveyed through application programming interface 258 were obtained. In scenarios in which the information provided through application programming interface 258 is derived from a mobile network operator, the time stamp may indicate the time at which the last update of information from the mobile network operator was received.

As yet another example of an attribute that may be provided through application programming interface 258, a plan reset date may be included. For networks that have charging policies that are based on usage during an interval, such as a month or billing cycle, a plan reset date attribute may indicate the date on which a new interval begins such that accumulated usage is effectively reset to zero on that date.

A further attribute may indicate the effective connected speed for mobile computing device 210. This attribute may indicate the effective link speed for mobile computing device 210. Such information may indicate conditions on the network. Alternatively or additionally, in embodiments in which the network employs a charging policy that includes throttling data transfers that exceed a cap, the information in this attribute may indicate a mode in which the network is currently operating.

It should be appreciated that FIG. 3 represents an example of information that may be provided to a cost aware user mode component through application programming interface 258. Different or additional information may be provided in some embodiments, and cost aware user mode components may use some or all of the information provided to control the performance of network operations that involve data transfer.

Table I illustrates examples of possible combinations of values that may be provided in fields 310, 312 and 322A . . . 322N. In the example provided by Table I, values representing charging policies, such as may be represented by a value in field 310, are listed in a column of Table I under the heading "Cost Value." A column under the heading "Flags" indicates possible values for flag field 312. Other columns in Table I provide examples of the attributes 320 that may be passed through application programming interface 258 in connection with other data cost information. Possible values for an attribute that identifies prior data usage are indicated in Table I under the column heading "Data Usage." Possible values for an attribute representing a threshold used to define a cap appear in a column of Table I under the heading "Cap Threshold." Possible values of a time stamp, indicating a time at which the data cost information provided to a user mode component through application programming interface 258 was acquired from a mobile network operator. Possible values of a further attribute, representing a date on which tracking of cumulative data usage resets in accordance with a subscription with a mobile network operator are indicated in the column under the heading of "Plan Reset Date." Though not illustrated in Table I, other attributes may be provided, such as an effective data rate for communication over the network.

Table I illustrates a plurality of possible cost states that have been defined for a network. Possible cost states are identified in a column under the heading "Cost States." Accordingly, each row in Table I indicates possible values in each of the fields provided through application programming interface 258 in a specific cost state. For example, the row of Table I corresponding to a cost state indicated as "Connection is unrestricted of cap or usage charges," identifies possible values for fields 310, 312, 322A . . . 322N for that cost state.

Specifically in this example, because the connection is unrestricted, field 310 contains a value indicating that the network charging policy corresponds to an unrestricted policy. Similarly, because there is no cap associated with the unrestricted charging policy, no flag will be set in this cost state to indicate usage relative to a cap.

For attributes 320, some may not be applicable for an indicated cost state. In the specific example of an unrestricted charging policy, an attribute corresponding to a cap threshold is not applicable, as indicated in Table I. Other attributes may take on numeric values. For example, an attribute indicating data usage may have any value representing an amount of prior data usage. An attribute indicating a time stamp may have any value indicating a time. An attribute indicating a plan reset date may also have any value indicating a date.

In other cost states, the fields 310, 312 and 322A . . . 322N may have different allowed values. For example, as indicated in the next row of Table I, when the cost states is "Connection is a cap plan and is operating below the cap threshold," field 310 may take on a value indicating that the charging policy is a fixed type charging policy. Though a cap may exist for this cost state, as indicated in the column for "Cap Threshold," because the mobile computing device is operating below the cap threshold, no flag is set in field 312 in this cost state.

Other attributes also may take on values in a cost state corresponding to a plan with a cap and operation below the cap threshold. For example, attributes representing data usage, cap threshold, time stamp or plan reset date may take on any value in this state.

As yet a further example, in a cost state indicating that "Connection is charged on a per byte basis," field 310 may take on a value, as indicated in the column entitled "Cost Value," representing a variable type charging policy. In this state, as indicated by the column entitled "Flags," the value in field 312 may indicate that no flags are set. In this cost state, a value for a cap threshold is inapplicable, but other attributes such as data usage, a time stamp and a plan reset date, may have any suitable value of the appropriate type.

Other rows of Table I indicate further possible cost states and acceptable values passed through application programming interface 258 in those states. Specifically in this example, Table I illustrates a further cost state of "Connection is approaching over cap," "Connection has reached over cap and is now being charged overage charges in bytes," "Connection has reached over cap and is now being throttled," "Connection is being throttled by the mobile network operator," and "Connection is roaming outside of the mobile network operator's network." Table I indicates possible values for each fields indicated in FIG. 3. For example, the charging policy reflected in field 310 may take on a value of "unrestricted," "fixed" or "variable" in the example illustrated in Table I. The flags represented by information in field 312, in the example illustrated by Table I, may be not set or may indicate an over cap condition or a throttled condition or a roaming condition.

The cost state reported through application programming interface 258 in response to a request for data cost information may be determined in any suitable way. The cost state, for example, may be reported by the mobile network operator. Alternatively or additionally, the cost state may be determined by cost service 256 or other component executing on mobile computing device 210. In the example represented by Table I, any of the cost states, except roaming outside of the mobile network operator's network, may be determined by the mobile network operator. The roaming state may not be indicated by the mobile network operator because the mobile network operator may not have a suitable means of communication with the mobile computing device 210 while it is roaming. Though, the specific mechanism by which the cost state and corresponding attribute values are determined is not critical to the invention.

TABLE I

| Cost States | Cost Value | Flags | Data Usage | Cap Threshold | Time Stamp | Plan Reset Date |
|---|---|---|---|---|---|---|
| Connection is unrestricted of cap or usage charges | Unrestricted | None set | Any value | Not Applicable | Any value | Any value |
| Connection is a cap plan and is operating below the cap threshold | Fixed | None set | Any value | Any value | Any value | Any value |
| Connection is charged on a per byte basis | Variable | None set | Any value | Not Applicable | Any value | Any value |
| Connection is approaching OverCap | Fixed | None Set | Any value | Any value | Any value | Any value |
| Connection has reached OverCap and is now being charged overage charges in bytes | Variable | Over Cap flag set | Any value | Any value | Any value | Any value |
| Connection has reached OverCap and is now being throttled | Fixed | Over Cap and Throttled flag set | Any value | Any value | Any value | Any value |
| Connection is being throttled by MNO | Unrestricted, Fixed or Variable | Throttled flag set | Any value | Any value | Any value | Any value |
| Connection is roaming outside of MNOs network | Unrestricted, Fixed or Variable | Roaming flag set | Any value | Not Applicable | Not Applicable | Not Applicable |

Figure 4:
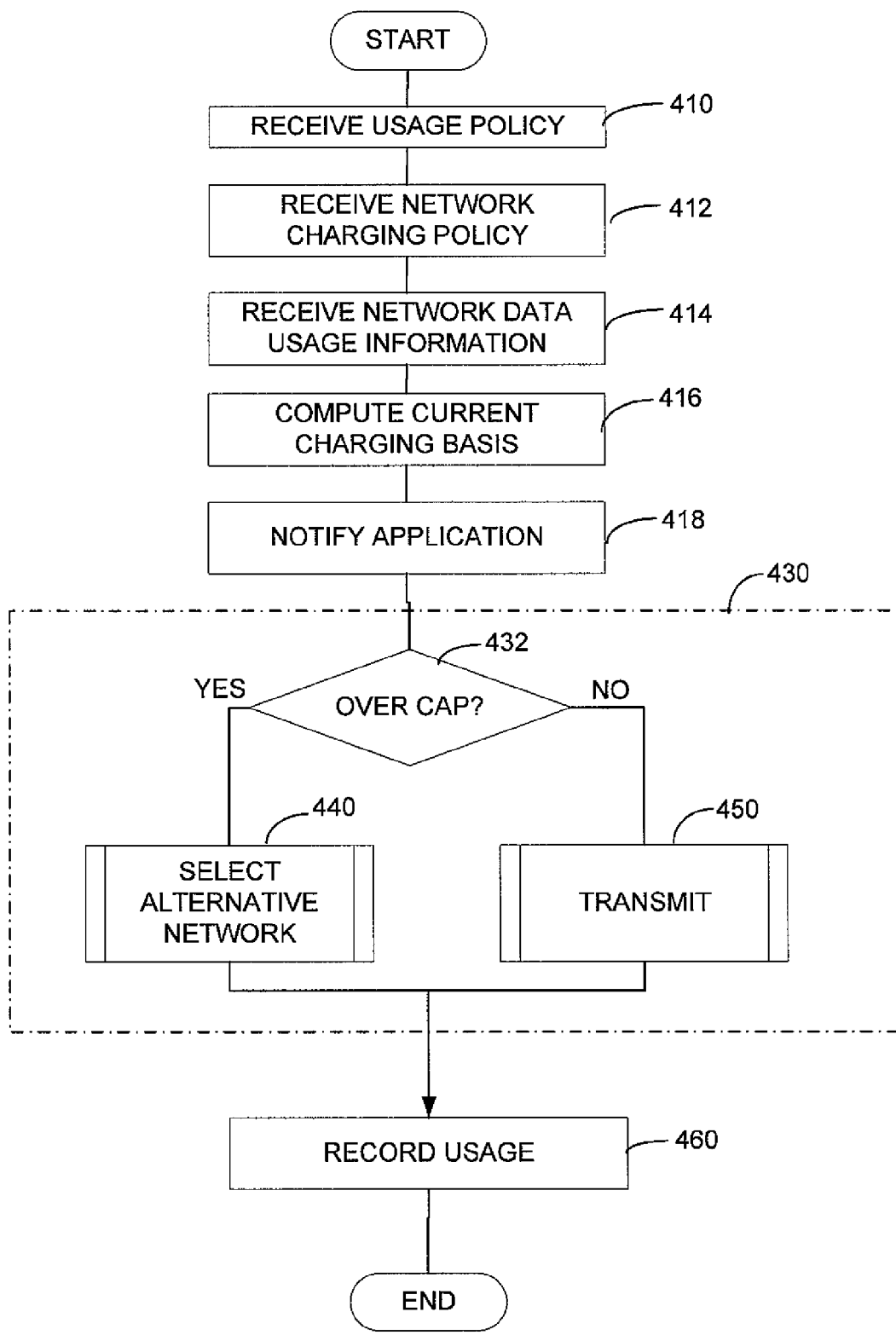
FIG. 4 is a flow chart of an exemplary method of operating a computing device with a cost service and a cost aware application.

Regardless of the manner in which the information passed through application programming interface 258 is generated and the specific values in specific fields, that information may be used by a cost aware user mode component to selectively perform network operations, taking into account the data cost information. FIG. 4 illustrates a process by which a mobile computing device configured with a cost aware operating system to support execution by cost aware user mode components is illustrated.

The process of FIG. 4 begins at block 410. At block 410, a component of mobile computing device 210 may receive a usage policy. The usage policy received at block 410 may be associated with a user mode entity, which may be an application or operating system service. Though, in some embodiments, the usage policy received at block 410 may relate to a user account or other suitable user mode entity.

In some embodiments, the usage policy received at block 410 may be received based on user input through user interface 260. In such an embodiment, cost service 256 may store the usage policy in data store 253. Though, data store 253 may be populated with data usage policies in any suitable way, including using techniques as described above.

Moreover, it is not a requirement that the processing at block 410 be performed by cost service 256. In embodiments in which sub process 430 is performed within a cost aware user mode component, the usage policy received at block 410 may be received by that cost aware user mode component. Accordingly, it is not a requirement that the processing at block 410 occur dynamically. Rather, the usage policy received at block 410 may be encoded into the cost aware user mode component at any time prior to its execution. Though, in other embodiments, the usage policy received at block 410 may be dynamically associated with a user mode component during operation of mobile computing device 210 in any suitable way. Examples of ways in which a usage policy may be dynamically associated with a user mode component are through the use of a plug-in that encodes the logic of the usage policy or by configuration settings that are adjusted by user input.

Regardless of the manner in which a usage policy is received at block 410, processing may proceed to block 412. At block 412, a network charging policy may be received. In the embodiment illustrated in FIG. 4, the network charging policy may be received by cost service 256 and stored in data store 252. Any suitable mechanism may be used to receive a network charging policy at block 412. The charging policy, for example, may be received from a mobile network operator or other source in any suitable way, including using the techniques as described above.

The process of FIG. 4 also includes receiving network data usage information at block 414. In some embodiments, this information may also be received from a mobile network operator. Though, in other embodiments, the information received at block 414 may be received from usage monitor 250. Though, the data usage information may be received in any suitable way, including using the techniques described above.

Regardless of the manner in which the charging policy and data usage information is obtained, this information may be used at block 416 to compute a current charging basis. Processing at block 416, for example, may result in identification of a cost state, represented by a cost value and a setting for flags, as indicated in one of the rows of Table I. This processing may be performed by cost service 256. Though, the specific mechanism by which the current charging basis is identified at block 416 and the manner in which this computation is represented is not critical to the invention, and any suitable technique may be used.

In the example of FIG. 4, the computation of the current charging basis is performed within cost service 256 and then supplied to the cost aware user mode component, which in this example is an application component. Accordingly, the process of FIG. 4 includes at block 418 notifying the application. Processing at block 418 may include passing through application programming interface 258 information in the format indicated in FIG. 3. Though, it should be appreciated that the specific format of the information provided is not critical to the invention, and any suitable information may be provided as part of the processing at block 418.

Based on this information, a cost aware application receiving the information at block 418 may perform sub process 430. In this example, sub process 430 represents conditional processing of a network operation. The network operation may involve transmission of data over a network for which data cost information was obtained at block 418.

In the example of FIG. 4, the processing within sub process 430 branches at decision block 432 based on whether the cost state indicates that mobile computing device 210 is in an over cap state. In the example represented by Table 1, this state may be identified based on a value in field 312. Though, the cost state of the network connection may be identified in any suitable way.

Regardless of the manner in which the cost state is identified, if usage has not exceeded the threshold associated with a cap, the process may branch to sub process 450. At sub process 450, the network operation may proceed as requested. In this example in which the network operation involves transmission of data, sub process 450 involves transmitting the data over the network. Though, it should be appreciated that transmission of data is an example only of possible network operations. Operations that trigger data being sent by an external device to mobile computing device 210 is another example of a network operation that may be conditionally processed within sub process 430. Moreover, operations that involve a combination of transmission and reception of data similarly may be conditionally processed. Accordingly, the specific operation that is conditionally processed is not a requirement of the invention.

Conversely, if processing at decision block 432 determines that mobile computing device 210 is in an over cap cost state, processing may branch from decision block 432 to sub process 440. Sub process 440 may entail processing the network operation in a way that entails less data usage than performing the network operation through sub process 450. Any suitable alternative processing may be performed at sub process 440 to result in less data usage. The network operation, for example, may be canceled, delayed, or performed in an alternative way that results in less data transferred over the network for which mobile computing device 210 is in an over cap cost state. Accordingly, processing at sub process 440 may entail data compression techniques. Such techniques may increase the delay in performing the network operation or may have other undesirable affects, such as reducing the resolution of graphics presented on user interface of computing device 210. Though, a cost aware application component may apply a usage policy reflecting such trade-offs between cost and performance or other attributes affecting operation of mobile computing device 210.

In the example of FIG. 4, the alternative processing performed in sub process 440 entails selecting an alternative network. The alternative network may be a wired or wireless network. In the example illustrated in FIG. 1, the alternative network selected may be a local area network, rather than a mobile brand band network. That network may be immediately available such that sub process 440 may be performed without delay. Though, in some embodiments, selecting an alternative network as part of sub process 440 may entail delaying the selection until an alternative, lower cost network is identified.

Upon completion of either sub process 440 or sub process 450, the sub process 430 may end, with conditional processing of the network operation being completed. The process of FIG. 4 may then continue to block 460. At block 460, whatever data was conveyed over a network may be recorded. In embodiments in which mobile computing device 210 includes a usage monitor 250, processing at block 460 may be performed by usage monitor 250. Though, in other embodiments, the usage may be monitored by a mobile network operator. Accordingly, processing at block 460 may entail receiving an update of data usage information from the mobile network operator. Such an update may be received immediately following transmission of the data as part of sub process 450 or may occur at any suitable time thereafter.

FIG. 4 shows the process ending after usage information is recorded at block 460. Though, it should be appreciated that all or a portion of the processing illustrated in FIG. 4 may be repeated as mobile computing device 210 operates. For example, upon completion of block 460, the processing may loop back to block 416 for processing of a network operation for the same or a different user mode component.

Figure 5:
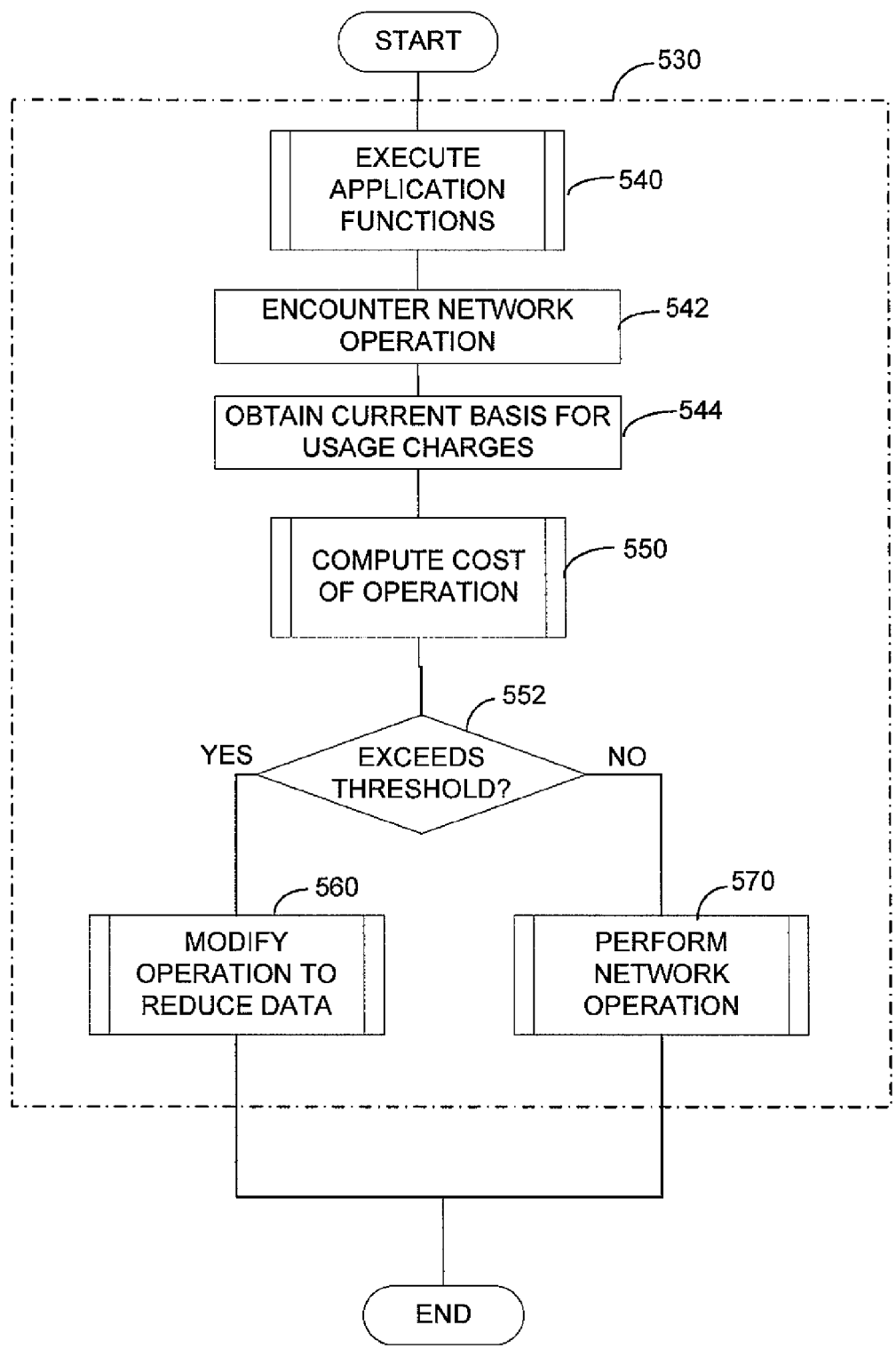
FIG. 5 is a flow chart of an exemplary method of operating a cost aware application.

FIG. 5 illustrates an alternative sub process 530 that may be performed within a cost aware application. In this example, processing within sub process 530 may begin at sub process 540. Within sub process 540, the cost aware application may execute application functions. Processing within sub process 540 may entail any suitable application functions, including those performed using techniques as are known in the art.

Sub process 540 may continue until execution of application functions results in a network operation being required. At block 542, such a network operation may be encountered. A network operation may be any operation that requires the transmission of data over a network or triggers the likely reception of data over the network.

Upon encountering a network operation as part of the cost aware application, processing may proceed to block 544. At block 544, the cost aware application may obtain a current basis for usage charges for data communicated over a network. Processing at block 544 may entail placing a call on application programming interface 258.

In the example of FIG. 5, the cost aware application computes the cost of the network operation as sub process 550. Sub process 550 may entail computing the cost in terms of dollars or other unit of currency. Though, qualitative measures of costs may alternatively or additionally be used. For example, the computation in sub process 550 may entail multiplying an expected number of bytes to be transmitted in order to complete the network operation encountered at block 542 by a current incremental cost of transmitting a byte of data. Such a computation may be based on the data charging policy for the mobile network operator as applicable to mobile computing device 210. That information may be acquired by cost service 256 in any suitable way, including using the techniques described above. In embodiments in which the data charging policy for the mobile network operator depends on prior data usage, information about prior data usage may also be obtained at block 544. With this information, the cost of the network operation may then be computed.

At decision block 552, sub process 530 may branch depending on the computed cost of completing the network operation. In this example, processing at block 552 involves comparing the computed cost to a threshold. The threshold used at decision block 552 may be based on a data usage policy applicable to mobile computing device 210 or, in some embodiments, applicable to the cost aware application performing sub process 530. Regardless of the manner in which that threshold value is obtained, if the cost of the network operation is below the threshold, processing may branch to sub process 570. At sub process 570, the network operation may be performed.

Conversely, if, based on processing at decision block 552, it is determined that the cost of the network operation will exceed the threshold, the sub process 530 branches to sub process 560. Processing at sub process 560 entails modifying the network operation to reduce the amount of data exchanged over the network. In this example, modifying the operation may entail foregoing transmitting or requesting certain types of data. Alternatively or additionally, sub process 560 may entail compressing data to be transmitted using lossless or lossy compression techniques or applying another suitable technique to reduce the amount of data transmitted.

Upon completion of sub process 560 or sub process 570, the processing illustrated in FIG. 5 may end. Though, it should be appreciated that such processing may be performed repeatedly during operation of a mobile computing device with one or more cost aware user mode components.

Figure 6:
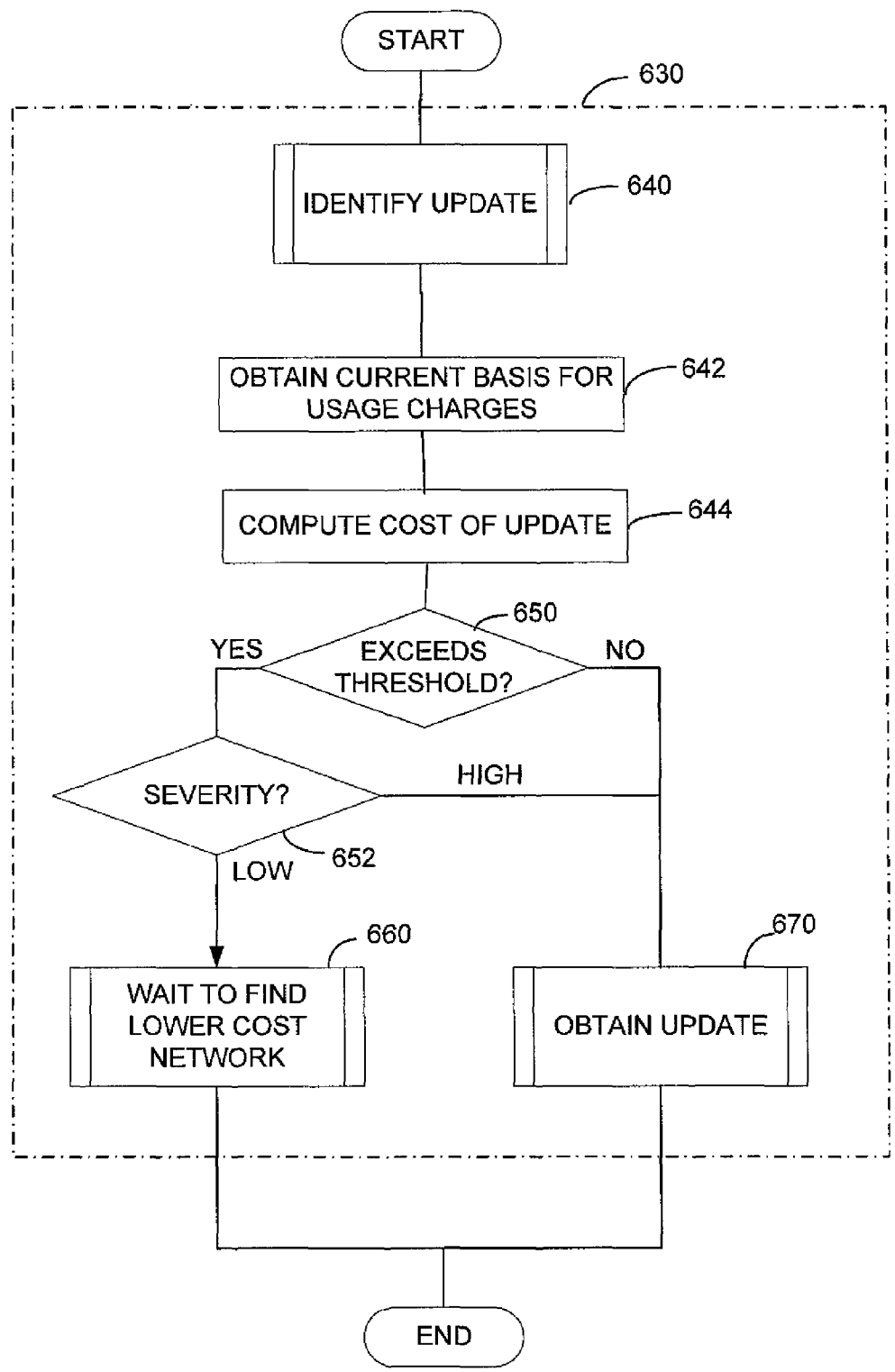
FIG. 6 is a flow chart of an exemplary embodiment of a method of operating a cost aware software update service.

Turning now to FIG. 6, a further alternative sub process 630 that may be performed by a cost aware user mode component is illustrated. In this example, sub process 630 is performed by an update service within the operating system of mobile computing device 210.

Sub process 630 begins with sub process 640. In this example, the update service identifies an available update for one or more software components of mobile computing device 210. Processing as part of sub process 640 to identify an available update may be performed in any suitable way, including using techniques as are known in the art. Processing at sub process 640, in addition to identifying an available update, may entail identifying a networked server from which the update may be obtained and a size, in terms of bytes of data that would be downloaded in performing the update.

Processing may then proceed to block 642 where the update service obtains the current basis for data usage charges on a network over which the update server can be accessed. Such information may be obtained by placing a call on application programming interface 258 or in any other suitable way. The data obtained at block 642, in some embodiments, may indicate a network charging policy and a current cost state for the network such that a cost aware update service may compute the cost of performing the identified update at block 644. Alternatively, the processing represented by blocks 642 and 644 may be performed within cost service 256. In that scenario, for example, a call on application programming interface 258 may entail providing to cost service 256 an amount of data to be transmitted as part of the update.

Regardless of the specific component that computes the cost of the operation, processing may proceed to decision block 650 where the process may branch depending on the cost. If the cost does not exceed a threshold, processing may proceed to sub process 670. The threshold employed at block 650 may be determined based on a charging policy. That charging policy may be specified for computing device 210 or some other entity or classification of entities. For example, the charging policy may be specified specifically for the cost aware update service. Though, in some embodiments, the usage policy may be specified for operating system components in the aggregate.

Regardless of the manner in which the threshold is obtained, if the computed cost for the update is less than the threshold, processing may branch to sub process 670 where the update is obtained. Conversely, if the cost exceeds the threshold, processing may branch to decision block 652.

At decision block 652, sub process 630 may again branch depending on criteria relating to the importance or priority of a network operation to be performed. In this example, the criteria applied at decision block 652 relate to the severity of the update identified in sub process 640. In this example, processing branches to sub process 670 when the update is classified as being of high severity. In that scenario, processing continues at sub process 670 where the update is obtained. Conversely, if the severity of the update is low, the process branches to sub process 660.

At sub process 660, the update service waits to find a lower cost network. Such processing may be implemented in any suitable way. For example, processing within sub process 660 may entail placing a call through application programming interface 258 to register with cost service 256 for a notification when a lower cost network is identified. Alternatively or additionally, processing as part of sub process 670 may entail canceling the update. In embodiments in which the cost aware update service periodically checks for available updates, canceling the update based on cost criteria when only high cost networks are available may achieve the affect of deferring the operation until a time for a periodic update coincides with availability of a lower cost network.

Upon completion of sub process 670, resulting in the identified update being completed, or completion of sub process 660, resulting in a deferral of the update operation, the processing illustrated in FIG. 6 may end. Though, the processing may be repeated at any suitable time.

Figure 7:
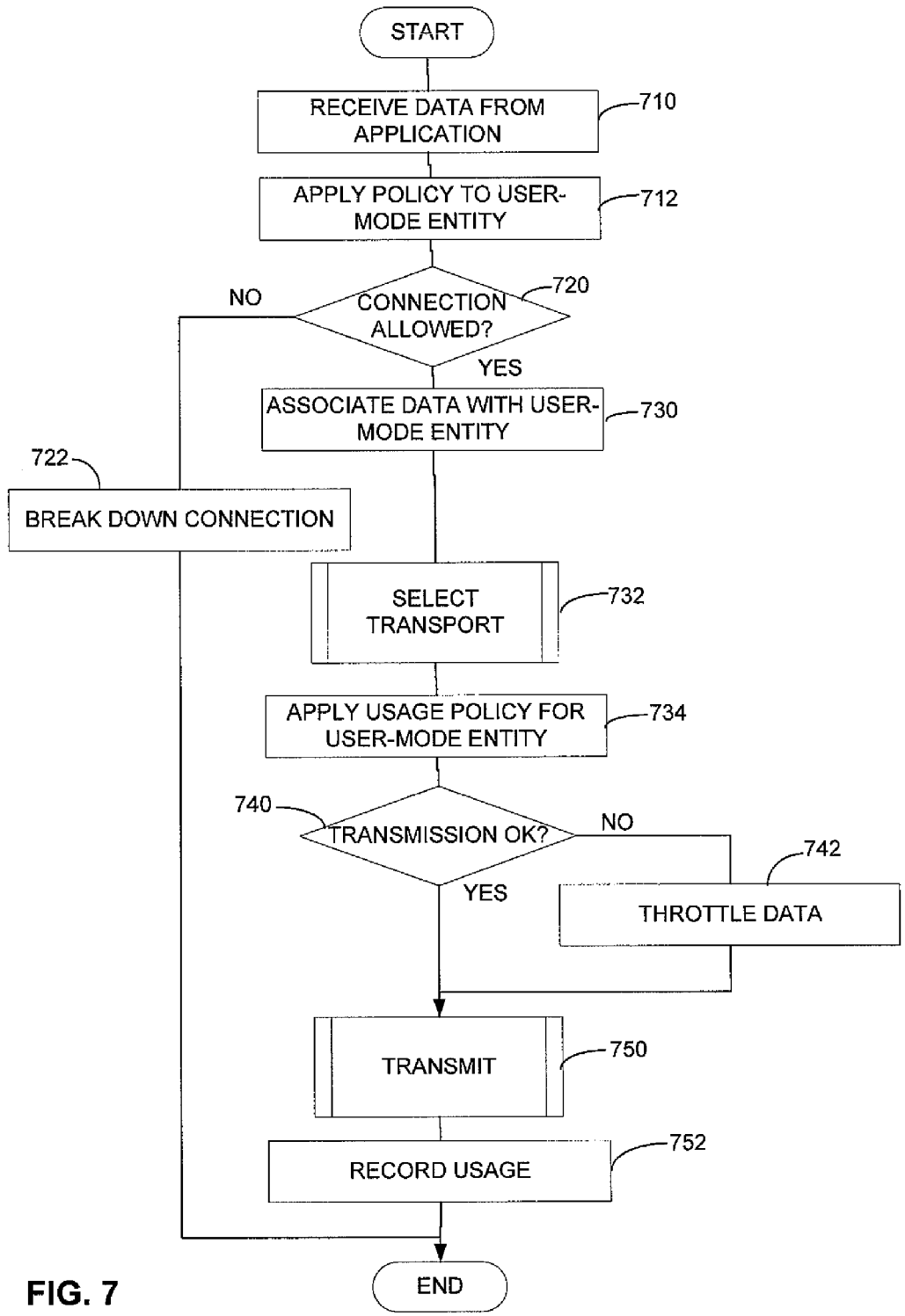
FIG. 7 is a flow chart of an exemplary embodiment of a method of processing data for transmission in a cost aware operating system.

FIG. 7 illustrates a further example of a process of operation of a mobile computing device that is made cost aware. In this example, a data usage policy is applied by a cost service and enforced within the operating system rather than within a cost aware application. In the example of FIG. 7, processing begins at block 710 where the operating system receives data from an application. In this scenario, the application need not be cost aware. Though, the process of FiG. 7 may be performed with cost aware applications.

Processing at block 710 may be performed in any suitable operating system component. As one example, with the architecture of FIG. 2, data from an application may be received at stack 230 through interface 236.

At block 712, cost service 256 may apply a data usage policy based on a user mode entity associated with the application initiating a data transfer operation at block 710. The user mode entity may be the application itself. Though, in other embodiments, the user mode entity may be a user account or other suitable entity that a cost aware operating system may associate with the operation at block 710.

Processing at block 712 may be performed by cost service 256 obtaining information from stack 230, such as through extensibility points within stack 230. Based on such information, cost service 256 may access data stores 252, 253, and/or 254. Though, in some embodiments, processing at block 712 may entail accessing a priority tag 238 passed through interface 236 from the application requesting an operation involving data transfer at block 710. Processing may then entail balancing the priority attached by the application to the cost state associated with the network or other indicator of incremental cost for transferring the required data over the network.

Regardless of how information about the policy is determined, based on the accessed information, cost service 256 may determine whether the operation indicated by the received data at block 710 is consistent with the data usage policy for the identified user mode entity.

The process of FIG. 7 may branch at decision block 720 depending on whether the operation indicated at block 710 is consistent with the data usage policy. If not, the process may branch to block 722. At block 722, a connection over which data received at block 710, absent cost considerations, would have been transmitted is broken down. The connection may be broken down by deleting data structures describing the connection or performing other operations as are known in the art. In scenarios in which processing at block 710 entails receiving a request to establish a connection, processing at block 722 may be completed by omitting any actions to establish that connection.

Upon completion of the processing at block 722, the process of FIG. 7 ends without the data being transmitted. In this scenario, an application requesting data transfer at block 710 may receive a notification using a mechanism as is known in the art that the requested operation was not completed. The application may execute exception handlers or other processing as is known in the art to respond to an unavailability of a network connection for the operation. In this way, handling of an exception condition resulting from an application attempting to perform a network operation outside of a data usage policy may be returned to the application. Though, a cost aware operating system may respond to such an attempt by an application to exceed a data usage policy in any suitable way.

Conversely, if as a result of processing at decision block 720, the connection is not disallowed, processing may proceed from decision block 720 to block 730. At block 730, the data for transmission may be associated with the user mode entity associated with the application component requesting the data transmission at block 710. Any suitable mechanism may be used at block 730 to associate data with a user mode entity, such as writing an identifier into a field associated with a buffer in memory holding the data.

Regardless of the manner in which the data is associated with a user mode entity, processing may proceed to sub process 732. At sub process 732, a transport for the data may be selected. Sub process 732 may be performed using techniques as are known in the art. Processing in sub process 732 may result in an identification of a network over which the data is to be transmitted. Such an identification may be made in any suitable way, including by applying criteria as are known in the art to select a network that maximizes criteria indicative of performance. Though, in the illustrated embodiment, the selection at sub process 732 may be based, at least in part, on cost of each network.

Following sub process 732, processing may be network specific. Accordingly, the process steps, including those at block 734 and decision block 740 may be based on a specific network and may be performed within lower stack portion 234. In contrast, processing at decision block 720 and block 730 may be network independent, and may be performed in upper stack portion 232. Associating a user mode entity with data to be transmitted at block 730 allows the processing in lower stack portion 234, though network specific, to also account for different policies applicable to different user mode entities. Accordingly, at block 734, the usage policy for the user mode entity may be applied in conjunction with data cost information for a specific network to determine whether transmission of the data complies with the usage policy for the user mode entity.

At decision block 740, the process of FIG. 7 may branch depending on whether transmission of the data is consistent with the policy applicable to the user mode entity. If so, the process may branch from decision block 740 to sub process 750 where the data may be transmitted over the selected network.

Though, if transmission is inconsistent with the usage policy for the user mode entity, processing may branch from decision block 440 to block 742. At block 742, processing to reduce data usage may be performed. In this example, the processing to reduce data usage involves throttling the data to reduce the rate at which the data is transmitted. The data may be throttled in any suitable way, including buffering the data within stack 230 or adjusting settings on firewall 240. Though throttling the data may not reduce the amount of data transmitted for a single network operation, throttling the data may reduce the rate at which network operations are performed, thereby lowering the total amount of data communicated over a network over time.

The process may then proceed to sub process 750 where the data, as throttled is transmitted. Regardless of whether sub process 750 entails transmitting the data with or without throttling, from sub process 750, processing may proceed to block 752. At block 752, the amount of data transmitted may be recorded. Recording transmitted data at block 752 may entail updating data store 254 or taking any other suitable action.

Thereafter, processing at FIG. 7 may end. Though, it should be appreciated that the processing represented by FIG. 7 may be repeated as further applications request operations that entail data transfer over a network.

Figure 8:
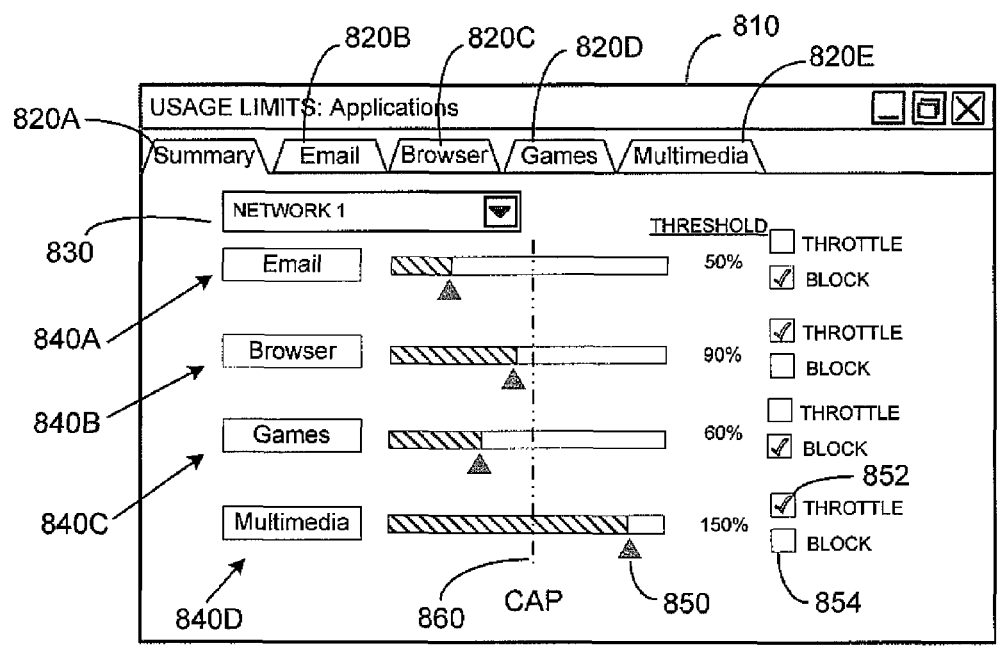
FIG. 8 is a sketch of an exemplary embodiment of a graphical user interface through which a user may specify data usage policies for applications executing on a computing device.

Turning to FIG. 8, an example of a technique for obtaining data usage policies is provided. As noted in FIG. 2, cost service 256 may be associated with a user interface 260 through which policy information may be provided by a user. FIG. 8 represents an example of a graphical user interface 810 that may be presented to obtain a portion of the information that may make up a data usage policies for user mode entities. In this example, the user mode entities are applications. In particular, the applications are shown by category. In this example, which is illustrative only, categories are shown for email applications, browser applications, games and multi-media applications.

FIG. 8 shows a user interface 810 through which a user may assign thresholds to each category of application. In this example, a display area is provided for each category of application. Display area 840A is provided for email applications. Display area 840B is provided for browser applications. Display area 840C is provided for games, and display area 840D is provided for multi-media applications. Each of the display areas has generally the same format in this example.

Each display area provides a mechanism by which a user may input values indicating a threshold amount of data usage below which the application will be permitted to perform operations that trigger data usage. Additionally, each display area contains controls through which a user may specify conditional processing to be performed when that threshold is exceeded. In this example, the threshold is specified as a percentage of a data usage cap for a network. The cap is illustrated graphically in graphical user interface 810 by indicator 860. Each of the display areas, of which display area 840D is representative, includes a slider 850. Slider 850 is an example of a graphical user interface control as is known in the art. A user may specify a value by interacting with graphical user interface 810 using a mouse or other suitable human interface device to indicate a position of slider 850.

In the scenario illustrated in FIG. 8, a user has positioned slider 850 to be in excess of the data usage cap for the network. Specifically in this example, slider 850 is positioned to indicate a threshold of 150% of the cap. A threshold indicating a value greater than the cap indicates that multi-media applications, which are associated with display area 840D, may be permitted to continue to perform network operations even after the data usage cap is exceeded and incremental charges for data usage are being incurred.

Moreover, display area 840D includes controls, such as controls 852 and 854, through which a user may specify conditional processing once the specified threshold is exceeded. In this example, controls 852 and 854 are check boxes. In the specific scenario illustrated in FIG. 8, control 852 has been activated, indicating user input that multi-media applications should be throttled after the threshold is exceeded. Though not activated in display area 840D, control 854 provides an alternative input that allows a user to specify that transmissions associated with multi-media applications are blocked once the specified threshold is exceeded.

Other display areas 840A, 840B and 840C associated with email applications, browser applications and games, respectively, similarly have sliders and controls, allowing a user to specify thresholds and conditional processing once the threshold is exceeded for those other types of applications. For example, display area 840A indicates that the user has selected a threshold of 50% of the cap for the network for e-mail applications. Display area 840A also indicates that a user has selected that, once data usage exceeds the specified threshold of 50%, email applications are blocked from initiating operations that require data transmission.

Display 840B indicates similar settings for browser applications. Though, in this case the threshold is set at 90% of the cap and the conditional processing entails throttling transmissions once the threshold is exceeded.

For games, as indicated in display area 840C, the user has set the threshold at 60% of the cap, and network operations requiring data transmissions associated with games are block once that threshold is exceeded.

In this example, graphical user interface 810 includes a control 830 through which a user may select a network for which the settings entered through graphical user interface 810 apply. In this example, control 830 is formatted as a drop down list box, which may be rendered using techniques as are known in the art. In the operating state illustrated in FIG. 8, a user has selected, through control 830, Network 1. Accordingly, the settings input through display areas 840A, 840B, 840C and 840D apply to Network 1. Through manipulation of control 830, a user may select a different network and may enter different values, creating different policies for other networks.

Graphical user interface 810 shows that a user may select multiple ways in which to input values forming a policy for user mode components. In this example, multiple tabs are illustrated, with different tabs associated with different classes of applications. Tab 820A has been selected, allowing a user to specify values for applications on a category by category basis. Other tabs, such as tabs 820B, 820C, 820D and 820E are also available. Through these tabs, a user may access other display areas through which a user may specify policy information for user mode entities in other ways. For example, accessing tab 820B may allow a user to access email applications individually and establish values of parameters of a usage policy for each application separately. Likewise, tabs 820C, 820D and 820E may allow a user to access display areas corresponding to browser applications, games and multi-media applications, respectively, and provide values defining policies for applications of these types individually. Accordingly, it should be appreciated at FIG. 8 represents just one example of a mechanism by which a user may specify policy values applicable to usage policies for user mode entities.

Figure 9:
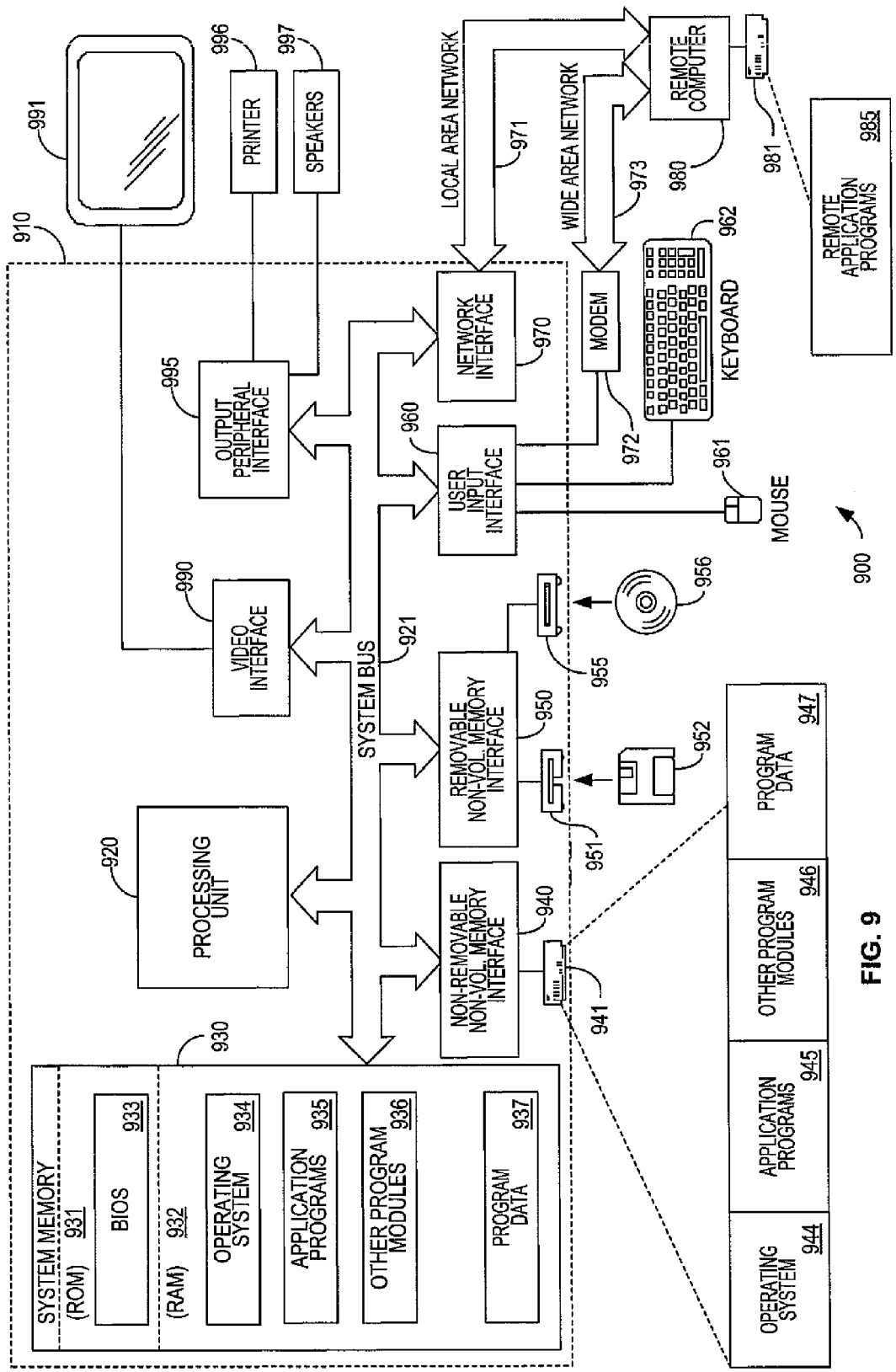
FIG. 9 is a block diagram of an exemplary computing device in which embodiments of the invention may be practiced.

The above described techniques may be implemented in any suitable computing device. FIG. 9 illustrates an example of a suitable computing system environment 900 on which the invention may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB), A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, it is described that applications may access an API maintained by an operating system to obtain current network information that includes a current basis for computing usage charges. This information may be presented as a cost per unit of data, which allows the application to compute a cost of a contemplated operation. Alternatively or additionally, this information may be presented directly as a cost of performing a contemplated operation.

Also, operation of a cost aware application has been described. It should be appreciated that an application is an example of a user-mode component. Other user-mode components, such as services executing in the operating system may access cost information and selectively perform operations involving data transmissions over a network based on that cost information.

Also, though automated techniques are described by which a service that uses cost information related to data usage may obtain that information, manual or semi-automated techniques may be used. For example, a user can expressly input cost information. Alternatively, a network interface card may be configured with such information or a data file containing such information may be loaded onto the computing device when the data service is activated or at other times.

Further, examples are provided in which management of network operations is performed based on user-mode entities. However, it should be appreciated that usage information may be collected for any suitable entity and that management of network operations may similarly may be performed on any suitable entities, including kernel mode or other components of an operating system.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed on a computing device, the method comprising:
    obtaining a charging policy comprising a plurality of charging models, each of the plurality of charging models corresponding to at least one of a plurality of data networks;
    determining whether an amount of data being considered for transfer via a selected network of the plurality of data networks exceeds a threshold corresponding to the selected network;
    in response to a determination that the amount of data exceeds the threshold, selecting an alternative network from the plurality of data networks based on the charging policy; wherein selecting the alternative network comprises:
        determining a lowest cost to transfer the amount of data according to the plurality of charging models; and
        selecting a data network that corresponds to the lowest cost as the alternative network; and
    transferring at least a portion of the amount of data via the alternative network,
        wherein transferring at least the portion of the amount of data comprises transferring, via the selected alternative network, the amount of data.

2. The method of claim 1 further comprising recording usage information based on the transferring.

3. The method of claim 1 where the data is associated with a particular application.

4. The method of claim 3, the determining further comprising providing the charging policy to the particular application.

5. A method performed on a computing device, the method comprising:
    obtaining a charging policy comprising a plurality of charging models, each of the plurality of charging models corresponding to at least one of a plurality of data networks;
    determining whether an amount of data being considered for transfer via a selected network of the plurality of data networks exceeds a threshold corresponding to the selected network;
    in response to a determination that the amount of data exceeds the threshold, selecting an alternative network from the plurality of data networks based on the charging policy; and
    transferring at least a portion of the amount of data via the alternative network, wherein each of the plurality of charging models indicates a first cost for the amount of data not exceeding the threshold and a second cost for the amount of data exceeding the threshold.

6. The method of claim 5 further comprising recording usage information based on the transferring.

7. The method of claim 5 where the data is associated with a particular application, wherein the determining comprises providing the charging policy to the particular application.

8. At least one computer storage device comprising computer-executable instructions that, when executed by at least one computing device, cause the at least one computing device to perform actions comprising:
    obtaining a charging policy comprising a plurality of charging models, each of the plurality of charging models corresponding to at least one of a plurality of data networks;

determining if an amount of data intended for transfer via a selected network of the plurality of data networks exceeds a threshold for the selected network;

in response to a determination that the amount of data exceeds the threshold, selecting an alternative network from the plurality of data networks based on the charging policy, wherein selecting the alternative network comprises:

determining a lowest cost to transfer the amount of data according to the plurality of charging models; and selecting a data network that corresponds to the lowest cost; and transferring at least a portion of the amount of data via the alternative network, wherein transferring at least the portion of the amount of data comprises transferring, via the alternative network, the amount of data.

9. The at least one computer storage device of claim 8, the actions further comprising recording usage information based on the transferring.

10. The at least one computer storage device of claim 8 where the data is associated with a particular application.

11. The at least one computer storage device of claim 10, the determining further comprising providing the charging policy to the particular application.

12. At least one computer storage device comprising computer-executable instructions that, when executed by at least one computing device, cause the at least one computing device to perform actions comprising:

obtaining a charging policy comprising a plurality of charging models, each of the plurality of charging models corresponding to at least one of a plurality of data networks;

determining if an amount of data intended for transfer via a selected network of the plurality of data networks exceeds a threshold for the selected network;

in response to a determination that the amount of data exceeds the threshold, selecting an alternative network from the plurality of data networks based on the charging policy; and transferring at least a portion of the amount of data via the alternative network, wherein each of the plurality of charging models comprises a first cost for the amount of data not exceeding the threshold and a second cost for the amount of data exceeding the threshold.

13. A system comprising a computing device and at least one software module that are together configured for performing actions comprising:

obtaining a charging policy comprising a plurality of charging models, each of the plurality of charging models corresponding to at least one of a plurality of data networks;

determining that an amount of data intended for transfer via a selected network of the plurality of data networks exceeds a threshold associated with the selected network;

in response to the determination that the amount of data exceeds the threshold, selecting an alternative network from the plurality of data networks based on the charging policy; wherein selecting the alternative network comprises:

determining a lowest cost to transfer the amount of data according to the plurality of charging models; and selecting a data network that corresponds to the lowest cost; and transferring data via the alternative network, wherein transferring the data comprises transferring, via the alternative network, the amount of data.

14. The system comprising a computing device and at least one software module of claim 13, the actions further comprising recording usage information based on the transferring.

15. The system comprising a computing device and at least one software module of claim 13 where the data is associated with a particular application.

16. The system comprising a computing device and at least one software module of claim 15, the determining further comprising providing the charging policy to the particular application.

17. A system comprising a computing device and at least one software module that are together configured for performing actions comprising:

obtaining a charging policy comprising a plurality of charging models, each of the plurality of charging models corresponding to at least one of a plurality of data networks;

determining that an amount of data intended for transfer via a selected network of the plurality of data networks exceeds a threshold associated with the selected network;

in response to the determination that the amount of data exceeds the threshold, selecting an alternative network from the plurality of data networks based on the charging policy; and transferring data via the alternative network, wherein each of the plurality of charging models comprises a first cost for the amount of data not exceeding the threshold and a second cost for the amount of data exceeding the threshold.

18. The system comprising a computing device and at least one software module of claim 17, the actions further comprising recording usage information based on the transferring.

19. The system comprising a computing device and at least one software module of claim 17 where the data is associated with a particular application.

20. The system comprising a computing device and at least one software module of claim 19, the determining further comprising providing the charging policy to the particular application.

* * * * *